United States Patent
Lumbatis

(10) Patent No.: US 12,495,451 B2
(45) Date of Patent: Dec. 9, 2025

(54) METHOD AND MECHANISM TO ASSIGN A UNIQUE IDENTIFIER TO A STATION FROM AN ACCESS POINT

(71) Applicant: Ruckus IP Holdings LLC, Claremont, NC (US)

(72) Inventor: Kurt A. Lumbatis, Dacula, GA (US)

(73) Assignee: Ruckus IP Holdings LLC, Claremont, NC (US)

(*) Notice: Subject to any disclaimer, the term of this patent is extended or adjusted under 35 U.S.C. 154(b) by 752 days.

(21) Appl. No.: 17/735,331

(22) Filed: May 3, 2022

(65) Prior Publication Data

US 2022/0264668 A1    Aug. 18, 2022

Related U.S. Application Data

(63) Continuation-in-part of application No. 17/575,887, filed on Jan. 14, 2022, which is a continuation-in-part of application No. 17/406,692, filed on Aug. 19, 2021, now Pat. No. 12,047,866, which is a continuation-in-part of application No. 16/743,623, filed on Jan. 15, 2020, now Pat. No. 11,109,302.

(Continued)

(51) Int. Cl.
*H04W 4/00* (2018.01)
*H04W 76/11* (2018.01)
*H04W 76/38* (2018.01)
*H04W 88/08* (2009.01)

(52) U.S. Cl.
CPC ............ *H04W 76/11* (2018.02); *H04W 76/38* (2018.02); *H04W 88/08* (2013.01)

(58) Field of Classification Search
CPC .............................. H04W 76/11; H04W 76/38
USPC ......................................................... 370/329
See application file for complete search history.

(56) References Cited

U.S. PATENT DOCUMENTS 9,942,010 B1   4/2018   Chu et al.
10,028,179 B2   7/2018   Cherian
(Continued)

FOREIGN PATENT DOCUMENTS

EP   3 965 363   3/2022
WO   2020/010126   1/2020

OTHER PUBLICATIONS

International Search Report and the Written Opinion of the International Searching Authority dated Aug. 23, 2022 in International (PCT) PCT/US2022/029987.

(Continued)

*Primary Examiner* — Temica M Beamer
(74) *Attorney, Agent, or Firm* — Chernoff, Vilhauer, McClung & Stenzel, LLP

(57) ABSTRACT

An access point can track a station throughout a network using an identifier, for example, a media access control (MAC) address. However, as MAC addresses are randomized or changing, there is a need for the access point to provide a unique identifier to a station that does not rely on a MAC address. The access point can receive a unique identifier query response action frame from the station that indicates that the station is associated with a corresponding unique identifier for the network and based on the unique identifier query response action frame, send a unique identifier set action frame to the station so as to cause the station to set as the unique identifier for the station the unique identifier of the unique identifier set action frame sent by the access point.

14 Claims, 19 Drawing Sheets

Related U.S. Application Data

(60) Provisional application No. 62/875,279, filed on Jul. 17, 2019, provisional application No. 62/792,744, filed on Jan. 15, 2019.

(56) References Cited

U.S. PATENT DOCUMENTS

| | | |
|---|---|---|
| 2009/0092085 A1 | 4/2009 | Ramesh et al. |
| 2012/0099574 A1 | 4/2012 | Tamura |
| 2013/0237216 A1 | 9/2013 | Ong |
| 2016/0135041 A1 | 5/2016 | Lee et al. |
| 2016/0135053 A1 | 5/2016 | Lee et al. |
| 2016/0269359 A1 | 9/2016 | Adrangi et al. |
| 2016/0381070 A1 | 12/2016 | Zhang et al. |
| 2017/0118602 A1 | 4/2017 | Seok et al. |
| 2017/0171737 A1 | 6/2017 | Mestanov et al. |
| 2019/0387459 A1 | 12/2019 | McCann et al. |
| 2020/0097675 A1 | 3/2020 | Levin |
| 2020/0229071 A1 | 7/2020 | Ansley et al. |
| 2021/0385728 A1 | 12/2021 | Hamilton |
| 2022/0053334 A1 | 2/2022 | Lumbatis et al. |
| 2022/0086736 A1 | 3/2022 | Lombatis et al. |

OTHER PUBLICATIONS

International Preliminary Report on Patentability dated Oct. 29, 2024 in International (PCT) Application No. PCT/US2023/020347.
International Search Report and the Written Opinion of the International Searching Authority dated Dec. 15, 2022 in International (PCT) Application No. PCT/US2022/046987.
Carol Ansley (Arris) "ID_Query_Proposal", IEEE Draft; 11-19-0496-01-000M-ID-QUERY Proposal, IEEE-SA Mentor, Piscataway, NJ USA vol. 802.11m, No. 1, Jul. 17, 2019 (Jul. 17, 2019), pp. 1-4, XP068153159.
Carol Ansley (Arris) : "IDQuery Query Message Proposal", IEEE Draft; 11-19-0179-01-0ARC-IDQuery-Query-Message-Proposal, IEEE-SA Mentor, Piscataway, NJ USA, vol. 802.11 ARC, No. 1, Mar. 14, 2019 (Mar. 14, 2019), pp. 1-8, XP068148268.
Office Action date Jan. 25, 2023 in Indian Application No. 202127031804 with English translation.
International Preliminary Report on Patentability issued Feb. 13, 2024 in corresponding International (PCT) Application No. PCT/US2022/029987.
International Preliminary Report on Patentability issued May 2, 2024, in International (PCT) Application No. PCT/US2022/050349.
International Preliminary Report on Patentability issued May 2, 2024, in International (PCT) Application No. PCT/US2022/050346.
International Search Report and Written Opinion issued Aug. 24, 2023 in International Application No. PCT/US2023/020347.
Lombatis et al., "Private Identifier Requirements for TGbh," Wireless LANs, IEEE 802.11-21/1634r2, Jan. 2022, 4 pages.
Hamilton et al., "Proposed Text for ID Query Action Frame," Wireless LANs, IEEE P802.11, 11-21/1379t3, Oct. 2021, 8 pages.
802.11 Working Group of the 802 Committee, "Draft Standard for Information Technology—Telecommunications and information exchange between systems—Local and metropolitan area networks—Specific requirements," Part II: Wireless LAN Medium Access Control(MAC) and Physical Layer (PHY) specifications, IEEE P802.11uT™/D8.03, Mar. 2010, 204 pages.
International Search Report and Written Opinion issued Feb. 17, 2023 in International Application No. PCT/US2022/050346.
International Search Report and Written Opinion issued Feb. 17, 2023 in International Application No. PCT/US2022/050349.
Substantive Examination Report issued Mar. 24, 2023 in Indonesian Patent Application No. P00202106256 (with English translation).
Hamilton et al., "Proposed Text for ID Query Action Frame," IEEE P802.11 Wireless LANs, 11-21/1379:3, Oct. 2021, 7 pages.
International Search Report issued Apr. 16, 2020 in International (PCT) Application No. PCT/US2020/013688.
International Preliminary Report on Patentability dated Jun. 16, 2021 in International (PCT) Application No. PCT/US2020/013688.
International Preliminary Report on Patentability issued Apr. 30, 2024 in corresponding International (PCT) Patent Application No. PCT/US2022/046987.

| Requesting Network Type | Encryption Enabled |
|---|---|
| 1 byte | 1 byte |

| Response Code | Identifier Length | Unique Identifier | Identifier Duration | Vendor Specific Information |
|---|---|---|---|---|
| 1 byte | 1 byte | Variable size | 2 bytes | 2 bytes |

| Category | ID Query Action | Vendor Specific Information |
|---|---|---|
| 1 Octet | 1 Octet | Variable Sizes |

| Category | ID Query Action | ID Query Response | Identifier Length | Unique Identifier | Identifier Duration | Vendor Specific Information |
|---|---|---|---|---|---|---|
| 1 Octet | 1 Octet | 1 Octet | 2 Octets | 16 Octets | 2 Octets | Variable Sizes |

METHOD AND MECHANISM TO ASSIGN A UNIQUE IDENTIFIER TO A STATION FROM AN ACCESS POINT

CROSS REFERENCE TO RELATED APPLICATION

This application is a continuation-in-part of U.S. application Ser. No. 17/575,887, which was filed Jan. 14, 2022 and entitled "Communicating Types of Private Identifiers Supported in a WLAN Network" which is a continuation-in-part of U.S. application Ser. No. 17/406,692, which was filed Aug. 18, 2021 and entitled "Protected Pre-Association Station Identification" which is a continuation-in-part of U.S. application Ser. No. 16/743,623, which was filed Jan. 15, 2020 and entitled "Handling of Unique Identifiers for Stations", now U.S. Pat. No. 11,109,302, claiming the benefit of both U.S. Provisional Application Ser. No. 62/792,744, entitled "Handling of Randomized MAC Addresses in 802.11," which was filed on Jan. 15, 2019 and U.S. Provisional Application Ser. No. 62/875,279, entitled "Handling of Randomized MAC Addresses in 802.11," which was filed on Jul. 17, 2019, and all of which are incorporated herein by reference in their entirety.

TECHNICAL FIELD

This disclosure relates to an improved handling of unique identifiers for stations.

BACKGROUND

Wireless devices (e.g., WLAN (wireless local area network) or Wi-Fi devices) are increasingly adopting randomized MAC (media access control) addresses. This poses a problem for many parts of WLAN (e.g., Wi-Fi) infrastructure that may use a MAC address of a wireless device as a unique identifier for the wireless device.

Different users may have different expectations or requirements for privacy. Some users may prioritize privacy above other considerations. For example, an end user in a public area may not wish to allow their presence to be tracked, while an end user at home may see value in allowing a device to be recognized and tracked so that other features, such as parental controls, can operate as expected.

Because many users take advantage of the current systems, they will experience a perceived loss of utility when they are forced to log in every time because the access point 115 or a supervising system will not recognize the station 105. These users may view the ability to use a stored, randomized MAC address as still providing them with privacy when it really does not.

Therefore, it is desirable to improve upon methods and systems for handling unique identifiers for stations.

SUMMARY OF THE INVENTION

With the advent of random and changing MAC addresses, a unique identifier, also referred to as a private identifier, binds a specific non-access point device (such as a station) in a network (such as a WLAN) outside of the MAC address. The network can require such a unique identifier to join the network. The format and type(s) of unique identifier(s) supported by the network, however, must be communicated to a station joining the network. The present disclosure provides for an access point to communicate the types of unique identifiers supported by the network, thus ensuring that one or more stations attempting to join the network are aware of the types of unique identifiers supported by the network. Additionally, the network or an access point of the network can assign a unique identifier on a per station basis to any station within the WLAN if the station does not already have a unique identifier for the network and is capable of accepting the unique identifier. By using a unique identifier set action frame, the present invention provides a novel solution for setting a unique identifier for station even with randomized or changing MAC addresses. In this way, the one or more stations can respond appropriately to the request from an access point for a unique identifier.

An aspect of the present disclosure provides a method for an access point to provide a unique identifier to a station. The method comprises receiving a unique identifier query response action frame from the station that indicates whether the station is associated with a corresponding unique identifier for the network, and sending a unique identifier set action frame to the station based on the unique identifier query response action frame, wherein the unique identifier set action frame provides the unique identifier to the station.

In an aspect of the present disclosure, the method further comprises sending a unique identifier query request action frame to the station.

In an aspect of the present disclosure, the method further comprises receiving a set unique identifier query response action frame from the station.

In an aspect of the present disclosure, the method is such that the sending the unique identifier set action frame is after expiration of a response time period.

In an aspect of the present disclosure, the method is such that the unique identifier query response action frame is unsolicited.

In an aspect of the present disclosure, the method is such that the unique identifier set action frame comprises a time duration associated with the unique identifier.

In an aspect of the present disclosure, the method further comprises receiving a subsequent unique identifier query response action frame from the station that indicates the unique identifier previously set by the network, wherein the unique identifier is based on the unique identifier set action frame, and determining that the unique identifier remains valid for the network.

An aspect of the present disclosure provides an access point of a network to provide a unique identifier to a station. The access point comprises a memory storing one or more computer-readable instructions and a processor configured to execute the one or more computer-readable instructions to receive a unique identifier action frame response from the station that indicates whether the station is associated with a corresponding unique identifier for the network, and send a unique identifier set action frame to the station based on the unique identifier action frame response, wherein the unique identifier set action frame provides the unique identifier to the station.

In an aspect of the present disclosure, the processor is further configured to execute the one or more computer-readable instructions to send a unique identifier query request action frame to the station.

In as aspect of the present disclosure, wherein the process is further configured to execute the one or more instructions to further cause the access point to receive a unique identifier query response action frame from the station.

In an aspect of the present disclosure, wherein the sending the unique identifier set action frame is after expiration of a response time period In an aspect of the present disclosure, wherein the unique identifier query response action frame is unsolicited.

In an aspect of the present disclosure, wherein the unique identifier set action frame comprises a time duration associated with the unique identifier.

In an aspect of the present disclosure, wherein the process is further configured to execute the one or more instructions to further cause the access point to: receive a subsequent unique identifier query response action frame from the station that indicates the unique identifier previously set by the network, wherein the unique identifier is based on the unique identifier set action frame, and determine that the unique identifier remains valid for the network.

An aspect of the present disclosure provides a non-transitory computer-readable medium of an access point storing one or more computer-readable instructions for providing a unique identifier to a station, the one or more computer-readable instructions when executed by a processor of the access point, cause the access point to perform one or more operations of any one or more of the above method steps.

BRIEF DESCRIPTION OF THE DRAWINGS

FIG. 2A shows an example format for a unique identifier request.

FIG. 2B shows an example format for a unique identifier response.

FIG. 3A shows an example format for a unique identifier request that includes an ID (identifier) query action field.

FIG. 3B shows an example format for a unique identifier response that includes an ID query action field.

Like reference numbers and designations in the various drawings indicate like elements.

DETAILED DESCRIPTION

It is desirable to improve upon methods and systems for handling unique identifiers for stations. Methods, systems, and computer readable media can be operable to facilitate an exchange of messages between an access point and a station, wherein the access point requests a unique identifier from the station. The station may either respond with a message declining to provide a unique identifier or respond with a message including a unique identifier to be used by the access point for the station. The response from the station may include additional limitations on the use of the unique identifier by the access point. The access point may enforce different policies against a station depending upon how the station responds to the unique identifier request.

Described herein is an addition of a new message to 802.11 that explicitly allows an access point to ask a station for a unique identifier that it wishes to make known. The message cannot force a station to disclose information since some stations may choose to have decreased performance to preserve their privacy, but it allows a station to share information which is not in the standard today. Additionally, described herein is a new message to 802.11 that allows an access point to send an action frame to a station so as to cause the station to set a unique identifier for the station for use by the access point to uniquely identify the station while the station is within the network and/or for a set time period or duration.

Figure 1:
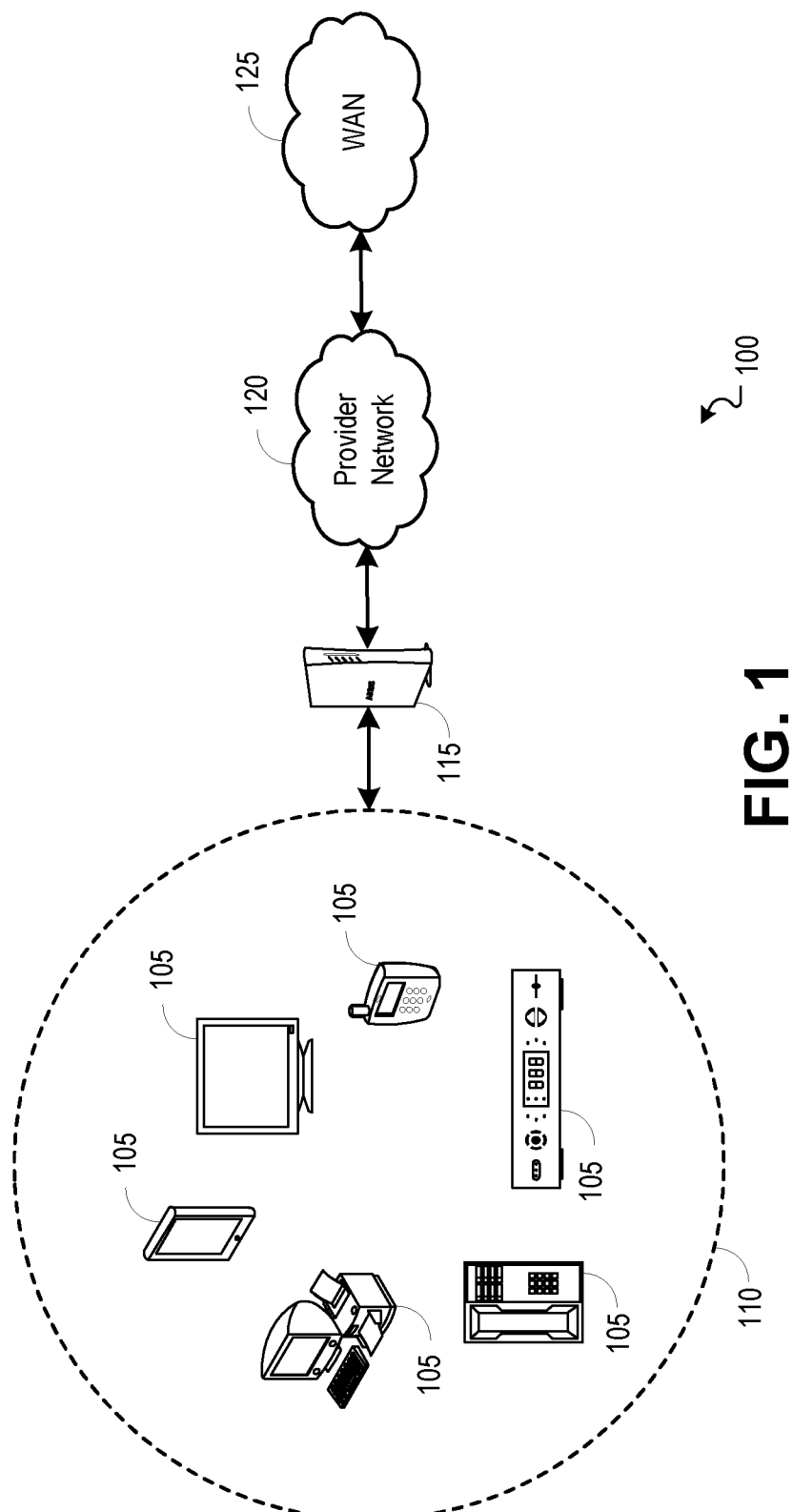
FIG. 1 is a block diagram illustrating an example network environment operable to facilitate management of a unique identifier for a station.

FIG. 1 is a block diagram illustrating an example network environment 100 operable to facilitate management of a unique identifier for a station. In embodiments, video, voice, and/or data services may be delivered to one or more stations 105 over one or more signal paths. Stations 105 may include a laptop, mobile device, tablet, computer, set-top box (STB), gaming device, wearable device, and any other device operable to receive video, voice, and/or data services. It should be understood that various data, multimedia, and/or voice services may be delivered to the stations 105, including but not limited to streaming video, streaming audio, file transfer, email, telephony services, and others.

Multiple services may be delivered to stations 105 over one or more local wireless networks 110. The local wireless network(s) 110 may include a wireless local area network (WLAN), personal area network (PAN), mobile hotspot network, and others. The local network 110 may be provided at a subscriber premise by one or more access points 115. An access point 115 may be, for example, a CPE (customer premise equipment) device and may include any device configured to facilitate communications between a Wide Area Network (WAN) and one or more stations 105, such as a modem, multimedia terminal adapter (MTA), embedded MTA (EMTA), gateway device, network extender, or other access device. An access point 115 may be integrated with other devices. For example, an access point 115 may include a broadband access modem (e.g., a modem may reside within a gateway device, STB, or other devices). It should be understood that delivery of the multiple services over the local network(s) 110 may be accomplished using a variety of standards and formats. It will be appreciated by those skilled in the relevant art that stations 105 may be capable of interacting and communicating with each other and/or with an access point 115 over various wireless communication standards (e.g., Wi-Fi, Bluetooth, etc.).

In embodiments, an access point 115 may be connected to a broadband access network 120 and may route communications between one or more stations 105 and a WAN (wide-area network) 125 through the connection to the broadband access network 120. Note that the broadband access network may itself be wired or wireless.

In general, and according to wireless communication standards, a station 105 will constantly probe for a new network if the station 105 is not currently connected. Typically, the probe messages contain, among other fields, a MAC (media access control) address for the station 105. A coordinated network may track movements of an end user by tracking the probe messages received at different access points if the network has knowledge of the MAC address of the end user's device.

To offer additional privacy to an end user, MAC randomization may be utilized. Randomized MAC addresses may be facilitated by using MAC addresses from the local MAC address space. A local MAC address can be identified if a "local" bit is set (e.g., second bit of the first byte of the MAC address). Use of a local MAC address space minimizes the chance of a device choosing a MAC address that might already be in use by another device. Use of this MAC address space also suggests to a receiving device (e.g., access point) that it has received a randomized MAC (rMAC) address which may influence actions that it takes with respect to that station.

Different device vendors have chosen to make use of randomized MAC addresses in different ways. For example, when a station is unassociated, the station may be configured to use a randomized MAC address that changes periodically when sending probe requests (e.g., rMAC is changed with each probe request, rMAC is changed after a specific time interval, etc.). A station may be configured to use an rMAC as a default option or as an option selected by an end user. When a station is associating with an SSID (service set identifier) provided by an access point, the station may be configured to use the same rMAC consistently for a given SSID, use a new rMAC for each association to an SSID, or may change an rMAC after a certain time interval (e.g., a new rMAC for each day, week, etc.). After a station has completed association, the station may be configured to use the same rMAC or may be configured to periodically change the rMAC used by the station after some event, such as the loss and reacquisition of that association. The association of a station 105 with an access point 115 may include the process of the station 105 joining a service set (e.g., SSID) or network that is provided by the access point 115.

In embodiments, the access point 115 may be configured to provide various features such as parental controls, device steering, and others depending upon the ability of the access point 115 to consistently identify a station 105 across association events. Additionally, infrastructure systems may use past behavior to provide improved steering and other services to a station 105, which would not be available if the station 105 cannot be recognized when it returns to the infrastructure ESS (extended service set)/BSS (basic service set).

To allow flexibility, a secured communication exchange (e.g., action frame exchange) is defined herein to allow an access point 115 to ask a station 105 for an additional, unique identifier. The communication exchange may include a unique identifier request that is output from the access point 115, and received by a station 105, and a unique identifier response that is transmitted from the station 105, to the access point 115, in response to unique identifier request. An access point 115 may enforce different policies against a station 105 depending upon how the station 105 responds to the unique identifier request. The communication exchange between the access point 115 and station 105 may be secured and kept private. The unique identifier request and unique identifier response messages may be wireless communications (e.g., 802.11 messages).

In embodiments, the request for a unique identifier may include an identification of type of network (e.g., network associated with an SSID) provided by the access point 115 (e.g., private data network, private guest network, hotspot network, public network, etc.) and/or an indication as to whether the network provided by the access point 115 is encrypted or not encrypted. The station 105 may be configured to respond to the unique identifier request based upon the type of network identified by the request and/or whether encryption is enabled. For example, the station 105 may apply a filter to the identification of the network type within the request to determine whether to respond. Based on the information within the request, the station 105 may determine the encryption on the information it provides. In embodiments, the unique identifier request may include an identification of a network encryption type.

In embodiments, a unique identifier response may include an indication whether the station 105 is providing the access point 115 with a unique identifier. For example, the station 105 may be configured to determine whether to provide a unique identifier based upon the type of network and/or encryption provided by the access point 115. The unique identifier response may include an identification of a length of a unique identifier to be associated with the station 105 and may include the unique identifier that is to be associated with the station 105. In embodiments, the unique identifier response may include an optional field for an identifier duration value. If no identifier duration value is included, the access point 115 may use the unique identifier for the station 105 for a default duration of time (e.g., only during the current association of the station 105 with the access point 115, permanently, etc.). Alternatively, the identifier duration value may indicate that the unique identifier is to be used for the station 105 only for the duration of the current association between the station 105 and the access point 115, upon which the access point 115 will store the unique identifier for the station 105 until the current association between the station 105 and the access point 115 ends. As another example, the identifier duration value may include a specific duration (e.g., time in seconds) for which the access point 115 stores the unique identifier for the station 105. In embodiments, the unique identifier response may include an optional field in which vendor specific options may be included.

When, during a first association between an access point 115 and a station 105, the access point 115 is authorized to permanently store the unique identifier for the station 105, the access point 115 may continue to store and/or use the unique identifier for the station 105. After the first association has ended, and during a second or subsequent association between the station 105 and the access point 115, the station 105 may be using a different identifier (e.g., rMAC) than one that was used by the station 105 during the first association between the access point 115 and the station 105. However, during the second or subsequent association, the station 105 may be using the same unique identifier (e.g., a unique identifier provided to the access point 115 through a unique identifier response) as the one that was used by the station 105 during the first association. In embodiments, during the second association between the access point 115 and the station 105, the access point 115 may recognize that the station 105 is using the same unique identifier as one that was previously used by the station during a previous association. In response, the access point 115 may use authorization(s) and/or behaviors, and/or enable one or more services or features that were used and/or enabled during a previous association between the access point 115 and the station 105. During the second or subsequent associations between the access point 115 and the station 105, the access point 115 may use these authorization(s) and/or permissions, and/or enable these services or features without requesting corresponding authorization(s) and/or permission(s) from the station 105 during the second/subsequent association(s) between the access point 115 and the station 105.

In embodiments, a station 105 may be configured with one or more requirements and/or limitations to be placed on an associated unique identifier. For example, the station 105 may decline to provide a unique identifier to an access point 115 when a type of network and/or an encryption status of a network with which the station 105 is associated do not meet certain criteria. Based on the network type and/or encryption status of a network, the station 105 may respond to a unique identifier request with a unique identifier response that does not include a unique identifier. Alternatively, if the network type and/or encryption status of the network meet certain criteria, the station 105 may generate a unique identifier response that provides the access point 115 with a unique identifier for the station 105 but limits the use or duration for which the access point 115 may use/store the unique identifier (e.g., a use limitation may be included in the unique identifier response).

In embodiments, a station 105 may generate a unique identifier based upon an algorithm with which the station 105 is configured and/or based upon a user input of a unique identifier or criteria for generating a unique identifier. For example, an end user may input a unique identifier to be used by the station 105, or the station 105 may be configured to generate a random unique identifier based upon a key. The unique identifier provided by the station 105 may be an identifier other than a MAC address of the station 105 or it may be the MAC address of the station 105.

The action frame may be available to an access point 115 after a station 105 has become associated. The action frame and response may be encrypted, assuming that the association is with a secure SSID so that the unique identifier provided by the station 105 within a response is protected from a person who is receiving the wireless transmission. A station 105 may consider only responding to the unique identifier request if the SSID is secure. For example, the station 105 may be configured to disregard a unique identifier request when the station 105 is associated with a network that is not secure (e.g., a public network or unencrypted network).

It should be understood that various requirements for and/or restrictions on the form of a unique identifier may be implemented. For example, a unique identifier may be required to be from a local MAC address space, or to take a certain form such as the UUID form popularized by Microsoft. A scenario may exist where only a specific configuration may be accepted by an access point as a unique identifier. In embodiments, an access point 115 may be able to ask any station 105 for a permanent unique identifier (e.g., a permanent MAC address, serial number, or other identifier).

A station 105 may present a local MAC address or an otherwise randomized MAC address while probing or after association. For some access points 115 and associated network services, a local MAC address that may change with each ESS association may restrict the services that an access point 115 can offer without additional authentication. An access point may use the unique identifier request message to request that an associated station 105 provide an identifying value that can be used across association events to consistently identify the particular station 105, even if its MAC address changes. The unique identifier request message may also include vendor specific information. Since the unique identifier request message is sent after a secure association is in place and protected management frames (PMF) has been negotiated between the requesting access point 115 and the target station 105, then the unique identifier in the unique identifier response will be secure and kept private.

A station 105 may receive a unique identifier request message from its associated access point 115 after a secure association is in place. The station 105 may respond with a unique identifier response that declines to provide the requesting access point 115 with a unique identifier, for example, if the station 105 does not trust the access point 115. The station 105 may respond with a unique identifier and also indicate the amount of time that the access point 115 may expect that unique identifier to be valid in an identifier duration field. If the station 105 does not indicate an identifier duration for the unique identifier, then the access point 115 may consider the unique identifier to be permanent. The unique identifier response may also include vendor specific information. An access point 115 might restrict access to the DS (downstream) in an implementation specific manner based on the unique identifier response or lack thereof from the station 105.

FIG. 2A shows an example format for a unique identifier request 205. The unique identifier request 205 may be transmitted from an access point 115 of FIG. 1 to a station 105 of FIG. 1 after the station 105 is associated with the access point 115. The unique identifier request 205 may be, for example, a secured action frame. The unique identifier request 205 may include a requesting network type field 210 and an encryption enabled field 215. A value (e.g., 1 byte) within the requesting network type field 210 may be used to identify a type of network with which a station is associated (e.g., value of 1=private data network; 2=private guest network; 3=hotspot network; etc.). A value (e.g., 1 byte) within the encryption enabled field 215 may be used to identify whether or not the network with which a station is associated is encrypted or not (e.g., value of 0=not encrypted; 1=encrypted; etc.).

FIG. 2B shows an example format for a unique identifier response 220. The unique identifier response 220 may be transmitted from a station 105 to an access point 115 in response to receiving a unique identifier request from the access point 115. The unique identifier response 220 may be, for example, a secured action frame. The unique identifier response 220 may include a response code field 225, an optional identifier length field 230, an optional unique identifier field 235, an optional identifier duration field 240, and/or an optional vendor specific information field 245. A value (e.g., 1 byte) within the response code field 225 may be used to identify whether a station is providing a unique identifier to be used by the access point for the station (e.g., a value of 0=decline to provide a unique identifier; 1=unique identifier is provided, etc.). A value (e.g., 1 byte) within the identifier length field 230 may be used to identify the length of a unique identifier that is provided. A unique identifier to be used by the access point for the station may be provided within the unique identifier field 235. A value (e.g., 2 bytes) within the identifier duration field 240 may be used to identify a duration for which the access point is to use the unique identifier provided for the station (e.g., 0=use unique identifier only for current association; 1-FFFF=a time in seconds for which the unique identifier is to be used, etc.). If the identifier duration field 240 is left blank, the access point may use the unique identifier for a default duration (e.g., permanently or some other specific duration of time). The vendor specific information field 245 may be used to provide any additional information or parameters associated with the station.

FIG. 3A shows an example format for a unique identifier request 305 that includes an ID (identifier) query action field. The unique identifier request 305 may be transmitted from an access point 115 of FIG. 1 to a station 105 of FIG. 1 after the station 105 is associated with the access point 115. The unique identifier request 305 may include a category field 310, an ID query action field 315, and an optional vendor specific information field 320. In embodiments, an ID query action field may be included within the unique identifier request and/or unique identifier response. Two action frame formats are defined to allow an access point 115 to query a station 105 for a unique identifier. An ID query action field, in the octet field immediately after the category field differentiates the formats. The ID query may be sent whether or not the station 105 provided a local MAC address.

The ID query request frame uses the action frame body format. It is transmitted from an access point to a station to request that the station provide a unique identifier that the access point may store and use for future identification of the station. The format of the action field in the ID query request frame is shown in FIG. 3A. The vendor specific information field 320 is optionally present and may include one or more vendor-specific elements.

FIG. 3B shows an example format for a unique identifier response 325 that includes an ID query action field. The unique identifier response 325 may be transmitted from a station 105 to an access point 115 in response to receiving a unique identifier request from the access point 115. The unique identifier response 325 may include a category field 330, an ID query action field 335, an ID query response field 340, an optional identifier length field 345, an optional unique identifier field 350, an optional identifier duration 355, and an optional vendor specific information field 360. The ID query response frame uses the action frame body format. The unique identifier response 325 is transmitted from a station to an access point in response to a request that the station provide a unique non-transitory identifier.

An embodiment of the format of the action field in the ID query response frame is shown in FIG. 3B. A value in the ID query response field may be used to identify whether the station declines to provide a unique identifier, or the station is providing a unique identifier. The station has the option to indicate that it will not provide a unique identifier value or that it will. When the ID query response field value is 0, the identifier length field, unique identifier field, identifier duration field and vendor specific information field are not present. When the ID query response field value is 1, the identifier length field, unique identifier field, identifier duration field and vendor specific information field are optionally present. The identifier length field indicates the length of the response in octets. The unique identifier field provides the identification value that the requesting access point may use to identify this station without regard to the MAC address used by the station in the MAC header. The unique identifier field 350 may have one or more minimal requirements (e.g., 16 octets, large enough to allow the use of a UUID, such as a variable size, etc.). A value within the identifier duration field may be used to identify a duration for which the access point is to use the unique identifier provided for the station (e.g., 0=use unique identifier only for current association; 1-65535=a time in minutes for which the unique identifier is to be used, etc.). A station may indicate that the unique identifier is permanent by not including this field while including a unique identifier in the unique identifier response 325. Otherwise, the lifetime of the unique identifier is as indicated.

The station capabilities information elements exchanged during association may include an extended capability bit to indicate whether a station can support an ID query action frame. For example, the extended capability bit may be set to 1 to indicate that a station can support an ID query action frame. At a higher layer, a user may direct a station to not share a permanent or semi-permanent identifier, so a station may still decline to provide a unique identifier even though it indicates support for the message. The vendor specific information field is optionally present when the ID query response field is 0 or 1 and includes one or more vendor-specific elements.

Figure 4:
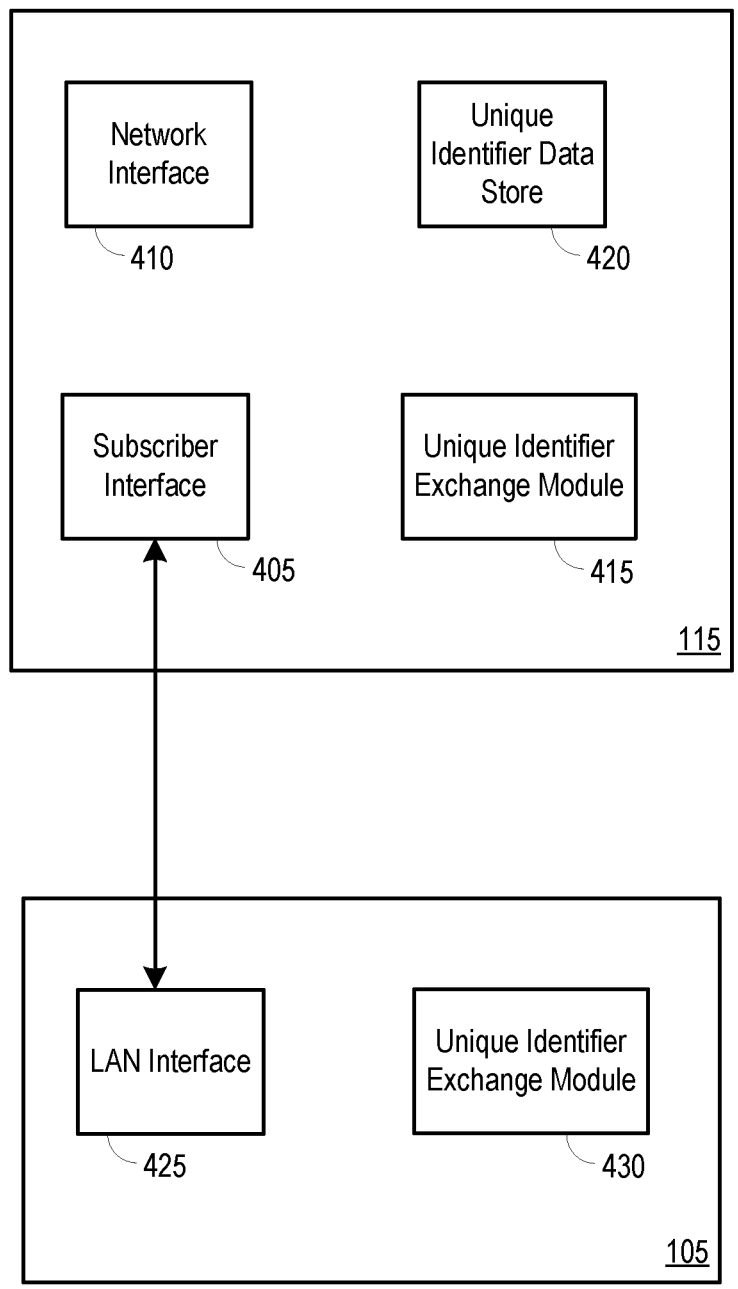
FIG. 4 is a block diagram illustrating an example access point operable to facilitate management of a unique identifier for a station.

FIG. 4 is a block diagram illustrating an example access point 115 operable to facilitate management of a unique identifier for a station 105. The access point 115 may include a subscriber interface 405, a network interface 410, a unique identifier exchange module 415, and a unique identifier data store 420. The station 105 may include a LAN interface 425 and a unique identifier exchange module 430.

In embodiments, communications may be output to and/or received from one or more stations 105 through a subscriber interface 405. Wireless communications and messages, comprising data, video, and/or voice communications, may be output from and/or received through the subscriber interface 405. It should be understood that the subscriber interface 405 may be configured to receive and/or output communications using various communication techniques, protocols, and standards (e.g., Wi-Fi). In embodiments, communications may be output to and/or received from one or more upstream networks (e.g., broadband access network 120 of FIG. 1, WAN 125 of FIG. 1, etc.) through the network interface 410.

In embodiments, the unique identifier exchange module 415 may generate and output unique identifier request messages. The unique identifier exchange module 415 may receive unique identifier response messages from stations 105, and the unique identifier exchange module 415 may ignore or store unique identifiers provided by unique identifier response messages according to various limitations and/or use/storage requirements retrieved from the unique identifier response messages. For example, the unique identifier exchange module 415 may store unique identifiers for one or more stations 105 within the unique identifier data store 420 (e.g., an association between a unique identifier and a station from which the unique identifier is received may be stored). The unique identifier provided by a unique identifier response that is received from a station may be stored as an identifier to be used to identify the specific station.

The unique identifier exchange module 415 may facilitate the use of unique identifiers for one or more stations to enable or disable one or more services or features provided to the stations 105 by the access point 115 (e.g., parental controls, device tracking, etc.). For example, when a station 105 provides a unique identifier for use by the access point 115, the access point 115 may enable one or more features or services offered to the station by the access point, wherein the one or more services require the use of a consistent and unique identifier of the station. When a station 105 declines to provide a unique identifier for use by the access point 115, the access point 115 may disable one or more features or services offered to the station by the access point, wherein the one or more services require the use of a consistent and unique identifier of the station.

In embodiments, a station 105 may transmit communications to and receive wireless communications from an access point 115 through the LAN interface 425.

The unique identifier exchange module 430 may receive unique identifier request messages from the access point 115 and generate and output unique identifier response messages. In embodiments, the unique identifier exchange module 430 may retrieve and/or generate a unique identifier for the station 105, and the unique identifier exchange module 430 may populate a unique identifier response message with the unique identifier for the station and/or one or more other field values (e.g., identifier duration value, vendor specific information, etc.). The unique identifier exchange module 430 may be configured with parameters and requirements (e.g., network type and/or encryption status requirements) for responding to a unique identifier request message.

Figure 5:
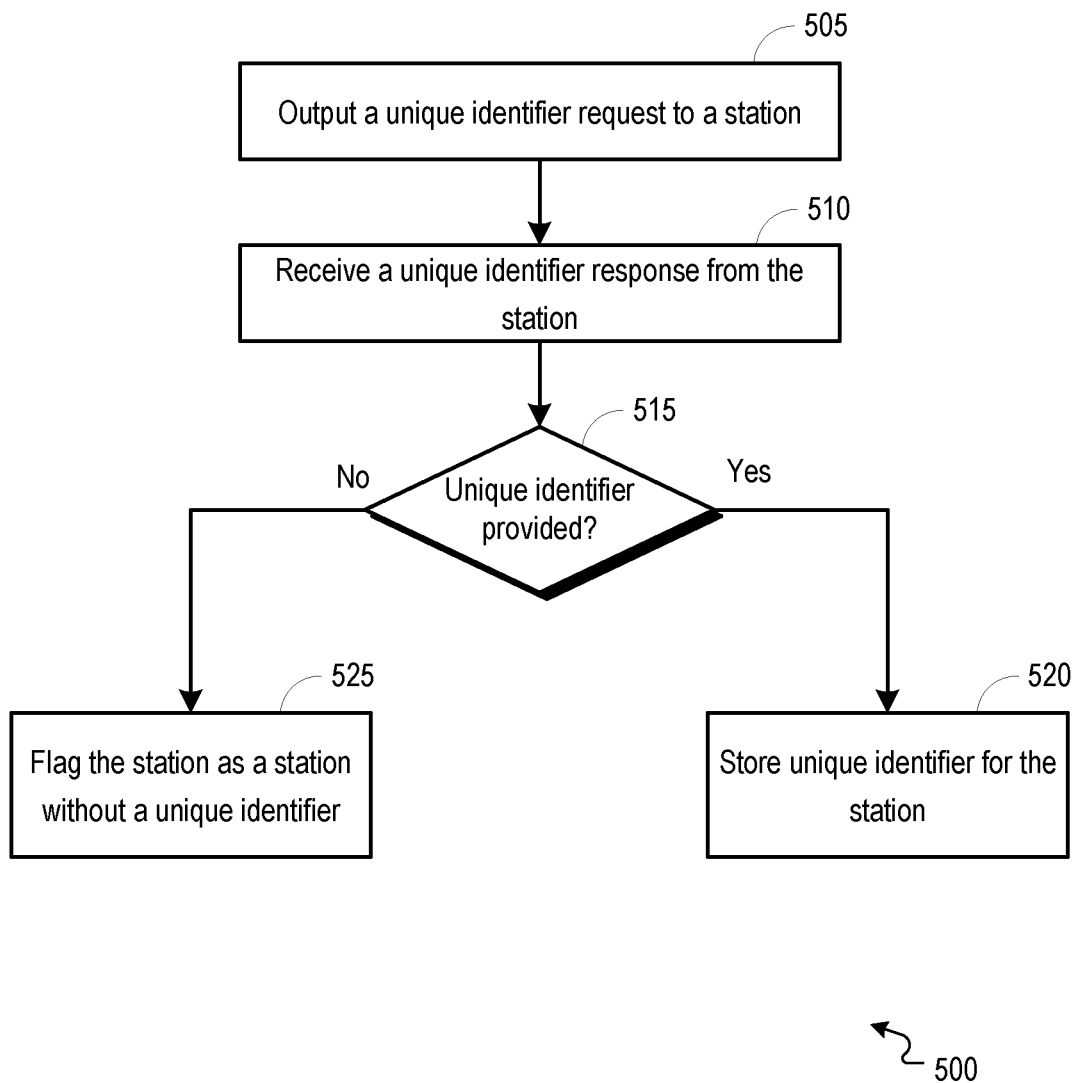
FIG. 5 is a flowchart illustrating an example process operable to facilitate managing a unique identifier recovered from a unique identifier response that is received from a station.

FIG. 5 is a flowchart illustrating an example process 500 operable to facilitate managing a unique identifier recovered from a unique identifier response that is received from a station. The process 500 can begin after a station (e.g., station 105 of FIG. 1) is associated with an access point (e.g., access point 115 of FIG. 1). The unique identifier response/request messages may be facilitated by a unique identifier exchange module 415 of FIG. 4 and/or a unique identifier exchange module 430 of FIG. 4. The process 500 can begin at 505, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request comprises a request that the station respond with a unique identifier that is to be used by the access point for the station.

At 510, a unique identifier response may be received from the station. For example, the access point 115 may receive the unique identifier response (e.g., unique identifier response 220 of FIG. 2B or 325 of FIG. 3B) from the station 105, and the unique identifier response may include an indication that the station either is or is not providing a unique identifier that is to be used for the station. The indication may be provided within a response code field 225 of FIG. 2B or ID query response field 340 of FIG. 3B.

At 515, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 515, the determination is made that a unique identifier is provided by the unique identifier response, the process 500 may proceed to 520. At 520, the access point 115 may store the unique identifier for the station 105. For example, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 515, the determination is made that a unique identifier is not provided by the unique identifier response, the process 500 may proceed to 525. At 525, the station 105 may be flagged as a station without a unique identifier. The access point may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

Figure 6:
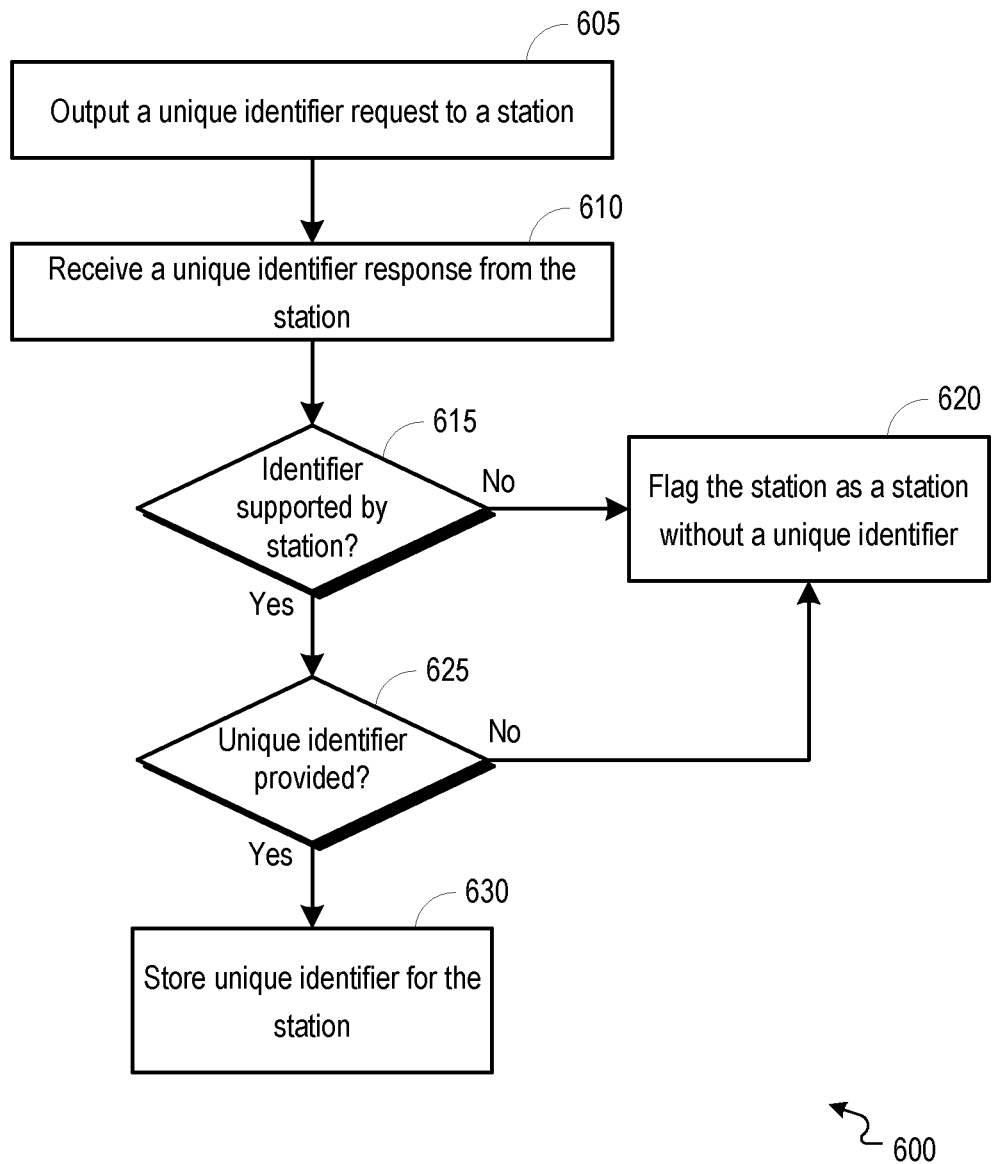
FIG. 6 is a flowchart illustrating an example process operable to facilitate managing a unique identifier recovered from a unique identifier response that is received from a station that supports an exchange of unique identifier messages.

FIG. 6 is a flowchart illustrating an example process 600 operable to facilitate managing a unique identifier recovered from a unique identifier response that is received from a station that supports an exchange of unique identifier messages. The process 600 can begin after a station (e.g., station 105 of FIG. 1) is associated with an access point (e.g., access point 115 of FIG. 1). Unique identifier response/request messages may be facilitated by a unique identifier exchange module 415 of FIG. 4 and/or a unique identifier exchange module 430 of FIG. 4. The process 600 can begin at 605, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request may include a request that the station respond with a unique identifier that is to be used by the access point for the station.

At 610, a unique identifier response may be received from the station. For example, the access point 115 may receive the unique identifier response (e.g., unique identifier response 220 of FIG. 2B or 325 of FIG. 3B) from the station 105, and the unique identifier response may include an indication whether the station 105 supports the creation and delivery of a unique identifier to the access point 115 (e.g., the indication may be provided within a response code field 225 of FIG. 2B, an ID query action field 335 of FIG. 3B, an ID query response field 340 of FIG. 3B, or other field of the response). The unique identifier response may include an indication that the station either is or is not providing a unique identifier that is to be used for the station. The indication may be provided within a response code field 225 of FIG. 2B or ID query response field 340 of FIG. 3B.

At 615, a determination may be made whether the station supports the creation and delivery of a unique identifier to the access point. For example, the access point 115 may determine whether the station 105 can provide a unique identifier (other than a known identifier such as a MAC address) based upon an indication provided within the unique identifier response. In embodiments, this determination may be made based upon the value of a capability bit. For example, if the capability bit is not set, the access point 115 may not ask the station 105 for a unique identifier.

If, at 615, the determination is made that the station does not support the creation and delivery of a unique identifier, the process 600 may proceed to 620. At 620, the station 105 may be flagged as a station without a unique identifier. The access point 115 may flag the station 105 as being unable to provide a unique identifier other than an identifier that is already known (e.g., a MAC address of the station 105) to the access point 115. Alternatively, the access point 115 may simply do nothing in response to the determination that the station cannot provide a unique identifier.

If, at 615, the determination is made that the station is capable of creating and delivering a unique identifier, the process 600 may proceed to 625. At 625, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 625, the determination is made that a unique identifier is not provided by the unique identifier response, the process 600 may proceed to 620. At 620, the station 105 may be flagged as a station without a unique identifier. The access point may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

If, at 625, the determination is made that a unique identifier is provided by the unique identifier response, the process 600 may proceed to 630. At 630, the access point 115 may store the unique identifier for the station 105. For example, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

Figure 7:
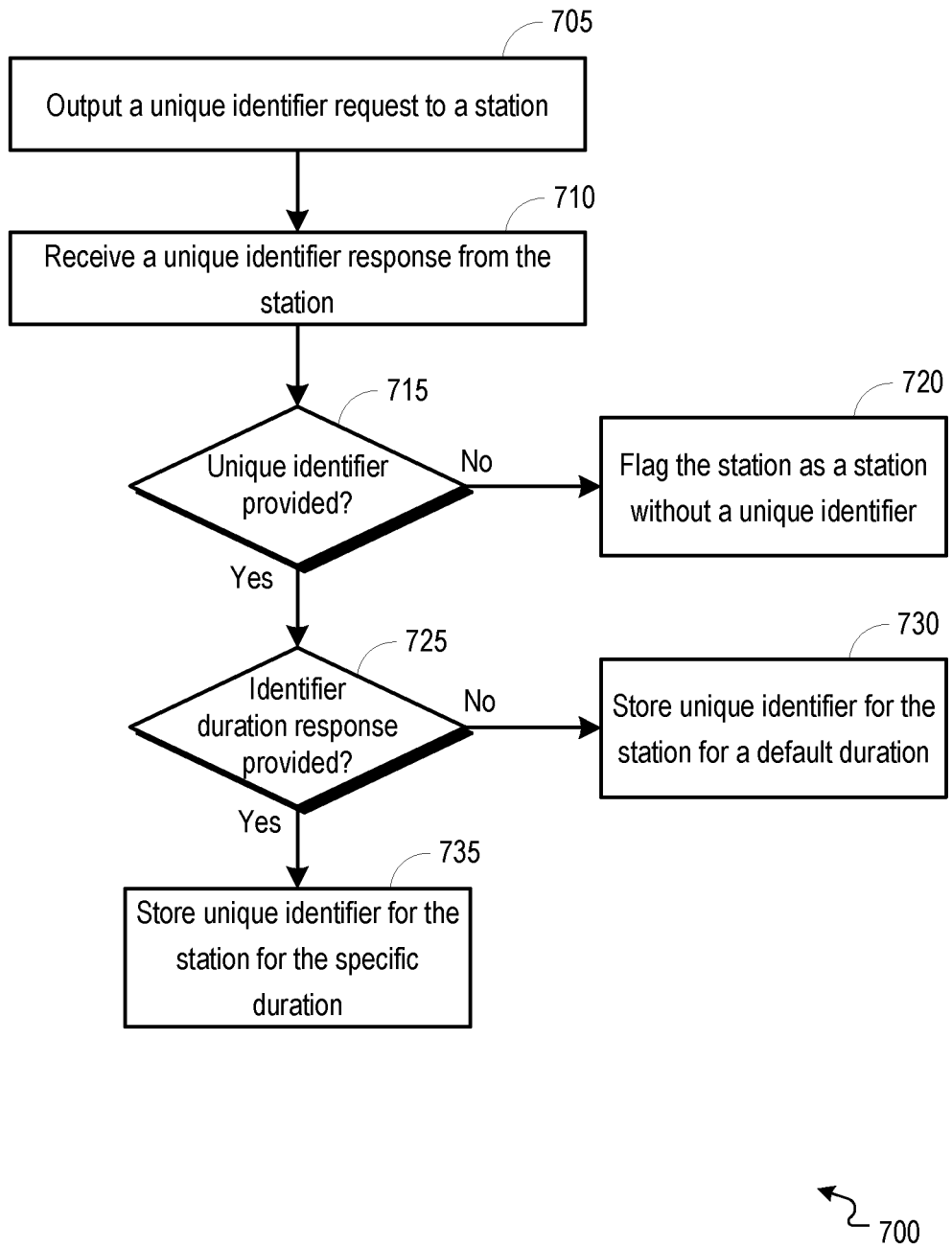
FIG. 7 is a flowchart illustrating an example process operable to facilitate managing a unique identifier recovered from a unique identifier response that is received from a station, wherein the unique identifier response includes an identifier duration field.

FIG. 7 is a flowchart illustrating an example process 700 operable to facilitate managing a unique identifier recovered from a unique identifier response that is received from a station, wherein the unique identifier response includes an identifier duration field. The process 700 can begin after a station (e.g., station 105 of FIG. 1) is associated with an access point (e.g., access point 115 of FIG. 1). Unique identifier response/request messages may be facilitated by a unique identifier exchange module 415 of FIG. 4 and/or a unique identifier exchange module 430 of FIG. 4. The process 700 can begin at 705, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request may include a request that the station respond with a unique identifier that is to be used by the access point for the station.

At 710, a unique identifier response may be received from the station. For example, the access point 115 may receive the unique identifier response (e.g., unique identifier response 220 of FIG. 2B or 325 of FIG. 3B) from the station 105, and the unique identifier response may include an indication that the station either is or is not providing a unique identifier that is to be used for the station. The indication may be provided within a response code field 225 of FIG. 2B or ID query response field 340 of FIG. 3B.

At 715, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 715, the determination is made that a unique identifier is not provided by the unique identifier response, the process 700 may proceed to 720. At 720, the station 105 may be flagged as a station without a unique identifier. The access point may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

If, at 715, the determination is made that a unique identifier is provided by the unique identifier response, the process 700 may proceed to 725. At 725, a determination may be made whether an identifier duration is provided within the unique identifier response. In embodiments, the unique identifier response may include an identifier duration field (e.g., identifier duration field 240 of FIG. 2B or identifier duration field 355 of FIG. 3B). If the identifier duration field has a value of zero (0) or is otherwise left blank, the access point 115 (e.g., the unique identifier exchange module 415) may determine that no identifier duration is provided. If the identifier duration field has a value other than zero (0), the access point 115 (e.g., the unique identifier exchange module 415) may determine that an identifier duration is provided.

If, at 725, the determination is made that no identifier duration is provided by the unique identifier response, the process 700 may proceed to 730. At 730, the access point 115 may store the unique identifier for the station 105 for a default duration. For example, the access point 115 may store the unique identifier for the station for a default duration, the default duration being the duration of a current association between the station 105 and the access point 115, permanently storing the unique identifier at the access point 115, or some other duration of time that is set as the default duration. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 725, the determination is made that an identifier duration is provided by the unique identifier response, the process 700 may proceed to 735. At 735, the access point 115 may store the unique identifier for the station 105 for the specific duration that is provided by the unique identifier response. For example, a value within the identifier duration field of the unique identifier response may indicate a duration of time (e.g., number of seconds, minutes, etc.) for which the unique identifier is to be used by the access point 115, and the access point 115 may only use the unique identifier for the station for the indicated duration of time. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

Figure 8:
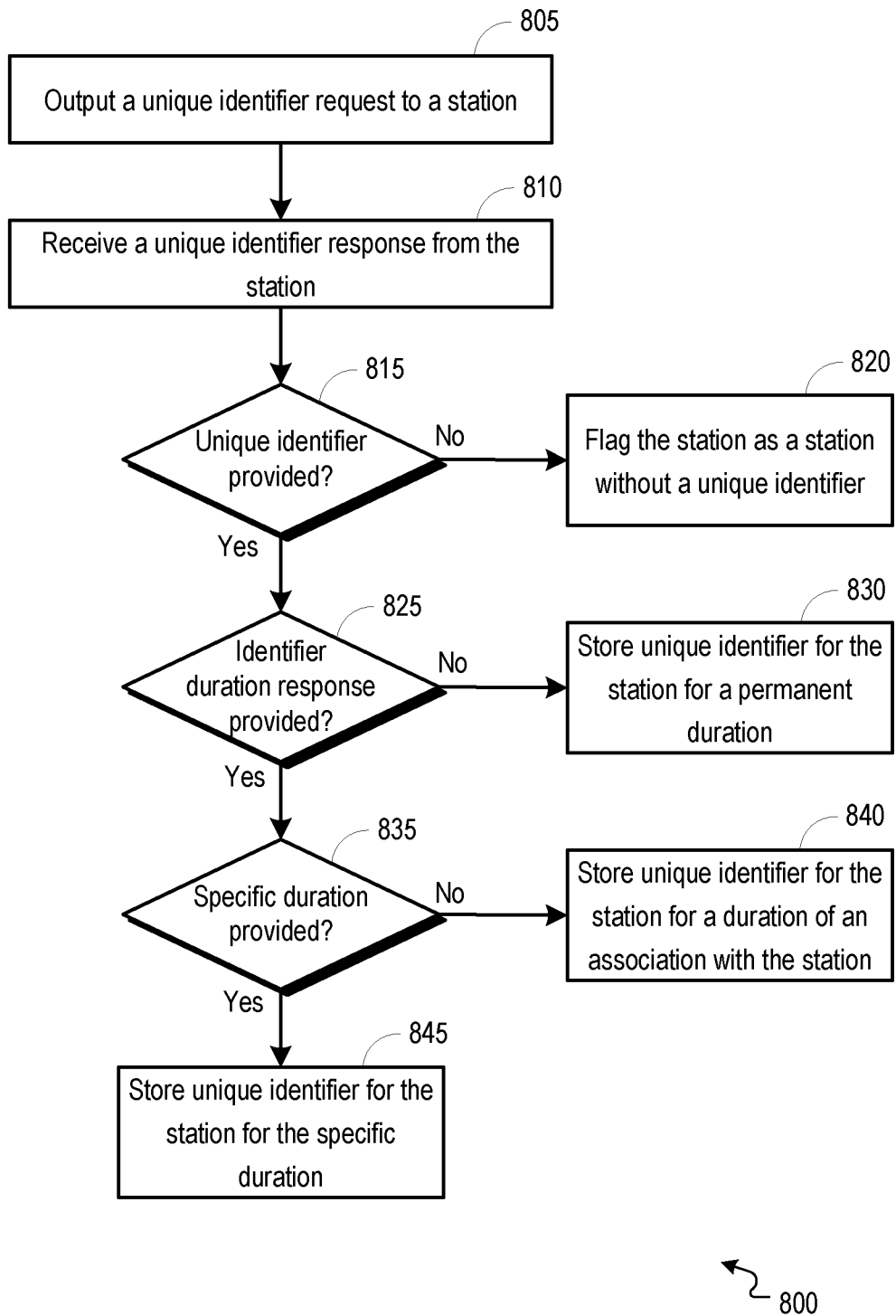
FIG. 8 is a flowchart illustrating an example process operable to facilitate managing a unique identifier recovered from a unique identifier response that is received from a station, wherein the access point permanently stores the unique identifier when an identifier duration response is not provided.

FIG. 8 is a flowchart illustrating an example process 800 operable to facilitate managing a unique identifier recovered from a unique identifier response that is received from a station, wherein the access point permanently stores the unique identifier when an identifier duration response is not provided. The process 800 can begin after a station (e.g., station 105 of FIG. 1) is associated with an access point (e.g., access point 115 of FIG. 1). Unique identifier response/request messages may be facilitated by a unique identifier exchange module 415 of FIG. 4 and/or a unique identifier exchange module 430 of FIG. 4. The process 800 can begin at 805, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request may include a request that the station respond with a unique identifier that is to be used by the access point for the station.

At 810, a unique identifier response may be received from the station. For example, the access point 115 may receive the unique identifier response (e.g., unique identifier response 220 of FIG. 2B or 325 of FIG. 3B) from the station 105, and the unique identifier response may include an indication that the station either is or is not providing a unique identifier that is to be used for the station. The indication may be provided within a response code field 225 of FIG. 2B or ID query response field 340 of FIG. 3B.

At 815, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 815, the determination is made that a unique identifier is not provided by the unique identifier response, the process 800 may proceed to 820. At 820, the station 105 may be flagged as a station without a unique identifier. The access point 115 may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

If, at 815, the determination is made that a unique identifier is provided by the unique identifier response, the process 800 may proceed to 825. At 825, a determination may be made whether an identifier duration response is provided within the unique identifier response. In embodiments, the unique identifier response may include an identifier duration field (e.g., identifier duration field 240 of FIG. 2B or identifier duration field 355 of FIG. 3B). If the identifier duration field 240 is left off the unique identifier response, the access point 115 may determine that no identifier duration response is provided. If the identifier duration field 240 is included within the unique identifier response, the access point 115 may determine that an identifier duration response is provided.

If, at 825, the determination is made that no identifier duration response is provided, the process 800 may proceed to 830. At 830, the access point may store/use the unique identifier for the station for some duration. For example, the access point may not delete or terminate use of the unique identifier for a specific duration of time or after the current association between the access point and the station is ended. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station

105, one or more features that are offered to stations for which a unique identifier is known.

If, at 825, the determination is made that an identifier duration response is provided, the process 800 may proceed to 835. At 835, a determination may be made whether a specific duration is provided by the identifier duration response. For example, if the identifier duration response includes a value of zero (0) or some other default value, the access point 115 may determine that no specific duration is provided, and if the identifier duration response includes any other value, the access point 115 may determine that a specific duration is provided.

If, at 835, the determination is made that no specific identifier duration is provided by the identifier duration response, the process 800 may proceed to 840. At 840, the access point 115 may store the unique identifier for the station 105 for a default duration. For example, the default duration may be the duration of a current association between the station 105 and the access point 115, in which case, the access point 115 will delete or otherwise stop using the unique identifier for the station after the current association between the station and the access point is ended. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 835, the determination is made that a specific identifier duration is provided by the identifier duration response, the process 800 may proceed to 845. At 845, the access point 115 may store the unique identifier for the station 105 for the specific duration that is provided by the identifier duration response. For example, a value within the identifier duration field of the unique identifier response may indicate a duration of time (e.g., number of seconds, minutes, etc.) for which the unique identifier is to be used by the access point 115, and the access point 115 may only use the unique identifier for the station for the indicated duration of time. In embodiments, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

Figure 9:
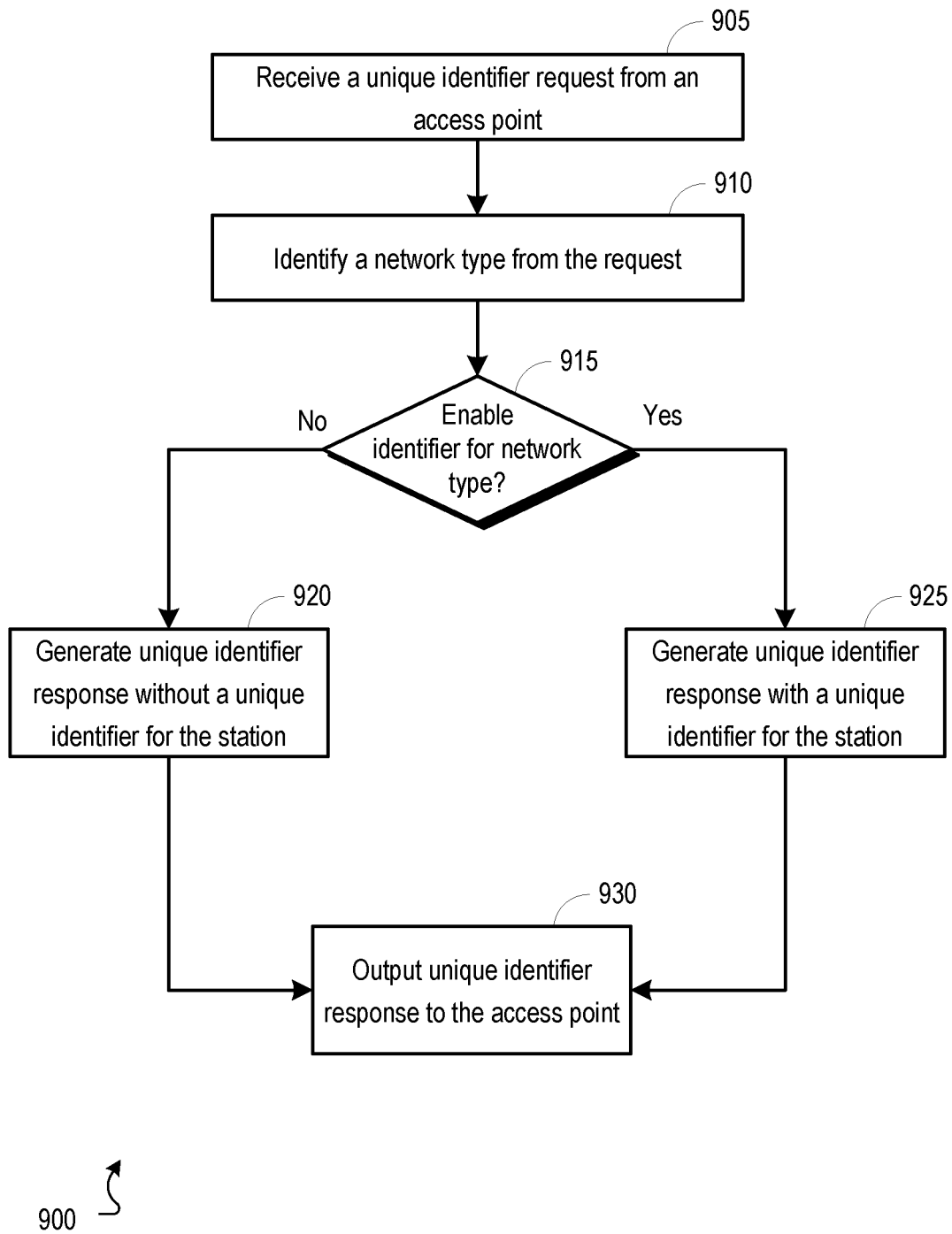
FIG. 9 is a flowchart illustrating an example process operable to facilitate generating a response to a unique identifier request.

FIG. 9 is a flowchart illustrating an example process 900 operable to facilitate generating a response to a unique identifier request. The process 900 can begin after a station (e.g., station 105 of FIG. 1) is associated with an access point (e.g., access point 115 of FIG. 1). Unique identifier response/request messages may be facilitated by a unique identifier exchange module 415 of FIG. 4 and/or a unique identifier exchange module 430 of FIG. 4. The process 900 can begin at 905, when a unique identifier request is received at a station 105, wherein the unique identifier request is output to the station 105 from an access point 115. When the station 105 has been associated with the access point 115, the access point 115 may generate and transmit a unique identifier request (e.g., unique identifier request 205 of FIG. 2A or 305 of FIG. 3A) to the station 105. The unique identifier request may include a request that the station respond with a unique identifier that is to be used by the access point for the station.

At 910, a network type may be identified from the unique identifier request. In embodiments, the unique identifier request may include an indication of the type of network provided by the access point 115 and with which the station 105 is currently associated (e.g., the indication may be provided within a requesting network type field 210 of FIG. 2A, a category field 310 of FIG. 3A, an ID query action field 315 of FIG. 3A, etc.). The unique identifier request may also include an indication as to whether the network is encrypted or unencrypted (e.g., the indication may be provided within an encryption enabled field 215 of FIG. 2A, a category field 310 of FIG. 3A, an ID query action field 315 of FIG. 3A, etc.). From the unique identifier request, the station 105 (e.g., the unique identifier exchange module 430) may determine the type of network (e.g., private network, public network, hotspot network, etc.) with which the station is associated and/or whether the network is encrypted or unencrypted.

At 915, a determination may be made whether a unique identifier generation feature is enabled for the identified network type and/or encryption status. For example, the station 105 (e.g., the unique identifier exchange module 430) may determine whether to provide the access point 115 with a unique identifier based upon the identification of the network type and/or the indication whether the network is encrypted or unencrypted. The station 105 may be configured with, for example, a filter to only allow the station 105 to provide an access point 115 with a unique identifier when the network with which the station 105 is associated is of a certain type and/or utilizing a certain encryption status or level. For example, the station 105 may be configured to only provide an access point with a unique identifier when the network with which the station is associated is a private network and/or an encrypted network.

If, at 915, the determination is made that the unique identifier generation feature is not enabled for the identified network type and/or encryption status, the process 900 may proceed to 920. At 920, a unique identifier response may be generated, wherein the unique identifier response does not include a unique identifier for the station. For example, the station may generate a unique identifier response having a value of a certain field (e.g., a response code field 225 of FIG. 2B or ID query response field 340 of FIG. 3B may be given a value of zero (0)) that indicates to the access point 115 that the station 105 is declining the option to provide the access point 115 with a unique identifier for the station 105. Alternatively, the station 105 may generate a unique identifier response that provides the access point 115 with a unique identifier for the station 105 but limits the use or duration for which the access point 115 may use/store the unique identifier (e.g., a use limitation may be included in an identifier duration field 240 of FIG. 2B or 355 of FIG. 3B or in some other field of the unique identifier response).

If, at 915, the determination is made that the unique identifier generation feature is enabled for the identified network type and/or encryption status, the process 900 may proceed to 925. At 925, a unique identifier response may be generated, wherein the unique identifier response includes a unique identifier for the station. For example, the station 105 may be configured to generate a unique identifier (e.g., random generation, preconfigured identifier, user input identifier, etc.) to be used by the access point 115. In embodiments, the station 105 may populate one or more other fields of the unique identifier response with values to indicate additional requirements/limitations of the use of the unique identifier by the access point 115 (e.g., identifier duration values, vendor specific options, etc.).

At 930, the unique identifier response generated by the station 105 may be output to the access point 115 from which the unique identifier request was received.

Figure 10:
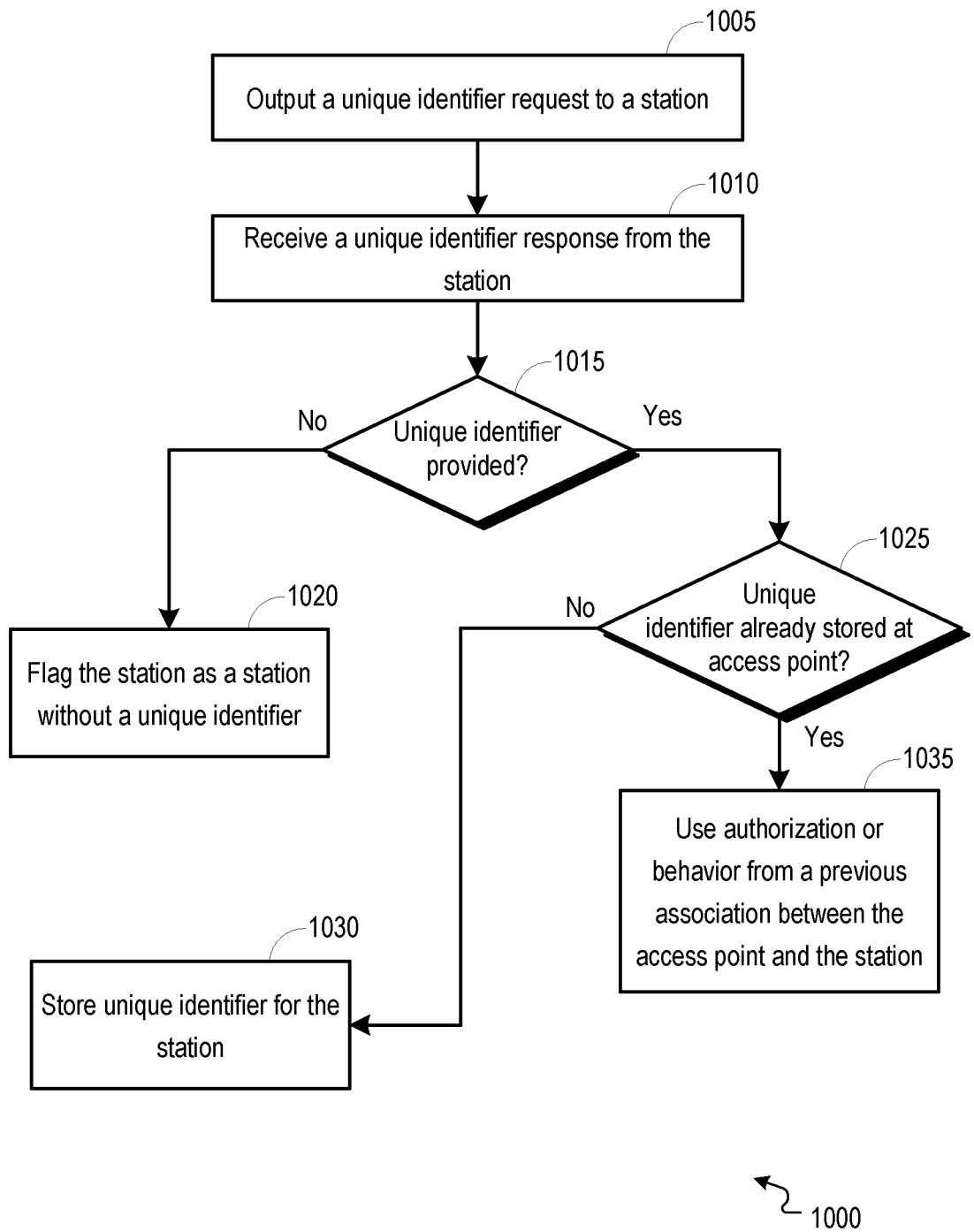
FIG. 10 is a flowchart illustrating an example process operable to facilitate managing a unique identifier recovered from a unique identifier response that is received from a station following a second or subsequent association between an access point and the station.

FIG. 10 is a flowchart illustrating an example process 1000 operable to facilitate managing a unique identifier recovered from a unique identifier response that is received from a station following a second or subsequent association between an access point and the station. The process 1000 can begin after a station (e.g., station 105 of FIG. 1) is associated with an access point (e.g., access point 115 of FIG. 1). The association between the access point 115 and the station 105 may be an association that occurs after a previous association between the access point 115 and the station 105 has ended. It should be understood that during the current association between the access point 115 and the station 105, the station 105 may be using a different identifier (e.g., rMAC) than the station 105 used during a previous association with the access point 115, but the station 105 may, during the current association, use the same unique identifier (e.g., the unique identifier provided in a unique identifier response) as the one used by the station 105 during a previous association with the access point 115. The unique identifier response/request messages may be facilitated by a unique identifier exchange module 415 of FIG. 4 and/or a unique identifier exchange module 430 of FIG. 4. The process 1000 can begin at 1005, when a unique identifier request is output to a station 105. When the station 105 has been associated with the access point 115, the access point 115 may generate and transmit a unique identifier request (e.g., unique identifier request 205 of FIG. 2A or 305 of FIG. 3A) to the station 105. The unique identifier request comprises a request that the station respond with a unique identifier that is to be used by the access point for the station.

At 1010, a unique identifier response may be received from the station. For example, the access point 115 may receive the unique identifier response (e.g., unique identifier response 220 of FIG. 2B or 325 of FIG. 3B) from the station 105, and the unique identifier response may include an indication that the station either is or is not providing a unique identifier that is to be used for the station. The indication may be provided within a response code field 225 of FIG. 2B or ID query response field 340 of FIG. 3B.

At 1015, a determination may be made whether the unique identifier response provides a unique identifier to be used for the station. In embodiments, the access point 115 may make this determination based upon whether a unique identifier is present within the unique identifier response or based upon whether the unique identifier response provides an indication whether a unique identifier is provided by the response.

If, at 1015, the determination is made that a unique identifier is not provided by the unique identifier response, the process 1000 may proceed to 1020. At 1020, the station 105 may be flagged as a station without a unique identifier. The access point may flag the station 105 as having declined or as being unable to provide a unique identifier other than an identifier that is already known (e.g., a MAC address of the station 105) to the access point 115. Alternatively, the access point 115 may simply do nothing in response to the determination that a unique identifier is not provided by the unique identifier response.

If, at 1015, the determination is made that a unique identifier is provided by the unique identifier response, the process 1000 may proceed to 1025. At 1025, a determination may be made whether the provided unique identifier is already stored at the access point 115. In embodiments, the access point 115 may have stored the unique identifier for the station 105 during a previous association between the station 105 and the access point 115, wherein the previous association has ended. For example, the unique identifier provided within the unique identifier response that is received by the access point 115 at 1005 may be the same unique identifier as one that was provided by the station 105 during a previous association with the access point 115 (e.g., a unique identifier provided within a unique identifier response that was received during a previous association between the access point 115 and the station 105).

If, at 1025, the determination is made that the unique identifier is not already stored at the access point, the process 1000 may proceed to 1030. At 1030, the access point 115 may store the unique identifier for the station 105. For example, the access point 115 (e.g., unique identifier exchange module 415 of FIG. 4) may retrieve the unique identifier from the unique identifier response and store the unique identifier (e.g., within the unique identifier data store 420 of FIG. 4) as the identifier to be used for the station 105. It will be appreciated that the access point 115 may then provide a variety of features (e.g., parental controls, end user tracking, etc.) to an end user by utilizing the stored association between the station and the unique identifier that is retrieved from the unique identifier response. For example, the access point 115 may enable, for the station 105, one or more features that are offered to stations for which a unique identifier is known.

If, at 1025, the determination is made that the unique identifier is already stored at the access point, the process 1000 may proceed to 1035. At 1035, the access point 115 may use authorization(s) and/or behavior(s) used during a previous association between the access point 115 and the station 105. For example, the access point 115 may use authorization(s) and/or behaviors, and/or enable one or more services or features that were used and/or enabled during a previous association between the access point 115 and the station 105. In embodiments, during the current association between the access point 115 and the station 105, the access point 115 may use authorization(s) and/or behaviors, and/or enable one or more services or features that were used and/or enabled during a previous association between the access point 115 and the station 105 without requesting corresponding authorization(s) and/or permission(s) from the station 105 during the current association between the access point 115 and the station 105.

Figure 11:
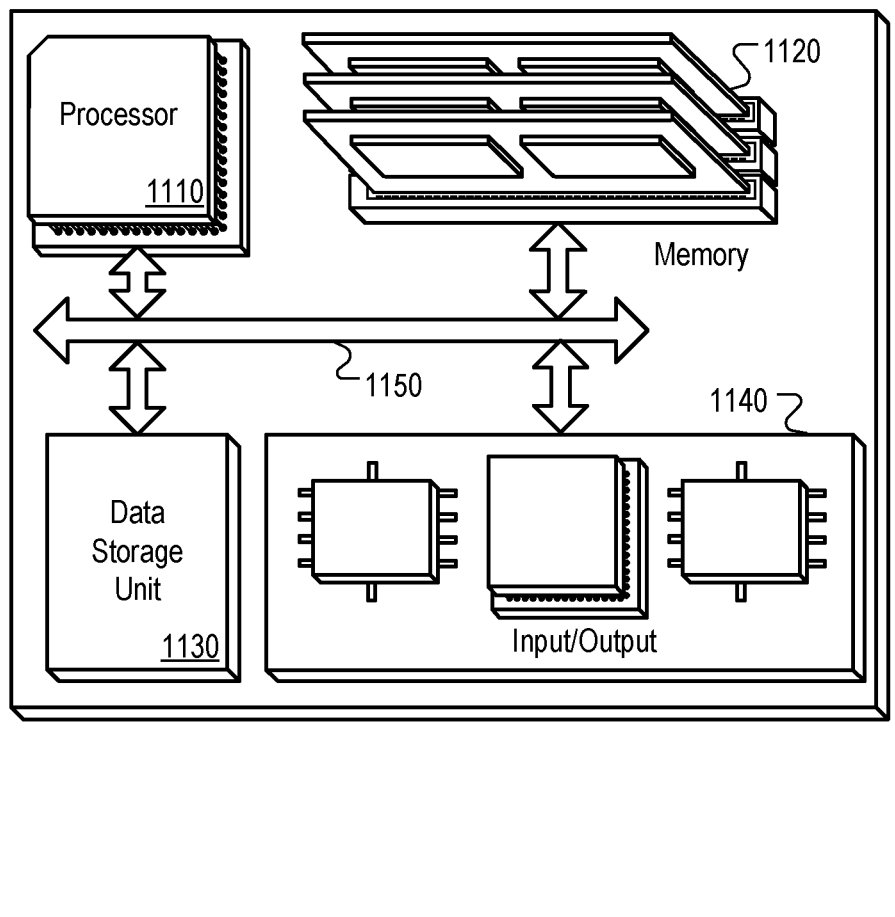
FIG. 11 is a block diagram of a hardware configuration operable to facilitate management of a unique identifier for a station.

FIG. 11 is a block diagram of a hardware configuration 1100 operable to facilitate management of a unique identifier for a station. The hardware configuration 1100 can include a processor 1110, a memory 1120, a storage device 1130, and an input/output device 1140. Each of the components 1110, 1120, 1130, and 1140 can, for example, be interconnected using a system bus 1150. The processor 1110 can be capable of processing instructions for execution within the hardware configuration 1100. In one implementation, the processor 1110 can be a single-threaded processor. In another implementation, the processor 1110 can be a multi-threaded processor. The processor 1110 can be capable of processing instructions stored in the memory 1120 or on the storage device 1130.

The memory 1120 can store information within the hardware configuration 1100. In one implementation, the memory 1120 can be a computer-readable medium. In one implementation, the memory 1120 can be a volatile memory unit. In another implementation, the memory 1120 can be a non-volatile memory unit.

In some implementations, the storage device 1130 can be capable of providing mass storage for the hardware configuration 1100. In one implementation, the storage device 1130 can be a computer-readable medium. In various different implementations, the storage device 1130 can, for example, include a hard disk device, an optical disk device, flash memory or some other large capacity storage device. In other implementations, the storage device 1130 can be a device external to the hardware configuration 1100.

The input/output device 1140 provides input/output operations for the hardware configuration 1100. In one implementation, the input/output device 1140 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card) for outputting video, voice, and/or data services to a station 105 of FIG. 1 (e.g., television, STB, computer, mobile device, tablet, telephone, wearable, etc.). In embodiments, the input/output device can include driver devices configured to send communications to, and receive communications from one or more networks (e.g., local network 110 of FIG. 1, broadband access network 120 of FIG. 1, WAN 125 of FIG. 1, etc.).

Figure 12:
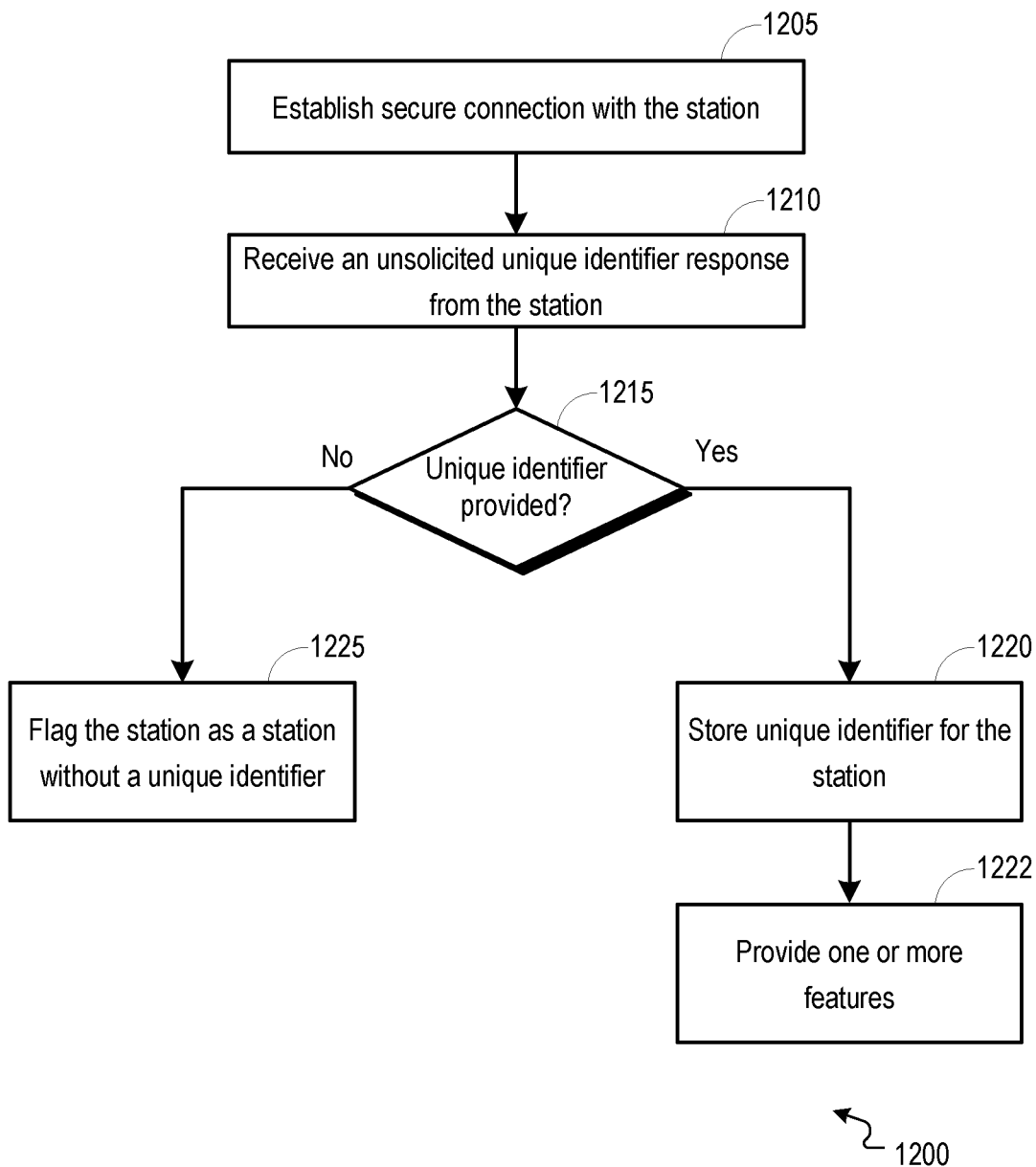
FIG. 12 is a flowchart illustrating an example process operable to facilitate receiving an unsolicited unique identifier response from a station.

FIG. 12 is a flowchart illustrating an example process 1200 operable to facilitate receiving an unsolicited unique identifier response from a station. The process 1200 begins prior to a station (for example, a station 105 of FIG. 1) being associated with an access point (for example, access point 115 of FIG. 1). The unique identifier response may be facilitated by a unique identifier exchange module 430 of station 105 of FIG. 4. The process 1200 can begin at 1205, when a secure connection (such as any of a secured protected link, secured communication path, secure tunnel, any other secure connection, or any combination thereof) is established between the access point and the station. Establishing the secure connection can comprise any of exchanging one or more encryption keys between the access point 115 and the station 105, a pre-association security negotiation (PASN) such that a PASN tunnel can be established between the access point 115 and the station 105, performing a robust secure network (RSN) association between the station 105 and the access point 115, or any combination thereof. In one or more embodiments, the station 105 can initiate the secure connection with the access point 115.

At step 1210, after the secure connection has been established, such as at step 1205, (for example, after the station has validated that the infrastructure (such as the access point or the network) is trusted or known and/or determined unilaterally that a unique identifier for the station is available or stored at the station, after establishing a PASN tunnel, any other type of secure connection, or any combination thereof) or after establishing a secure connection via an association (for example, an RSN association), the access point device can receive an unsolicited unique identifier response (for example, a unique identifier response 220 of FIG. 2B or 325 of FIG. 3B) from the station via the secure connection. The unique identifier response comprises a unique identifier, for example, any of a universal unique identifier (UUID), a random number, a pseudorandom number, a preconfigured identifier (such as an identifier that is stored on or otherwise configured for the station 105, including but not limited to an identifier assigned by a system administrator, a membership identifier, an employee identifier, any other identifier unique for a business or entity, or any combination thereof), or any combination thereof, that is to be used by the access point for the station. In one or more embodiments, the station can determine that the unique identifier of or associated with the station should be sent to the access point device based on a network parameter. Sending the unique identifier over the secure connection ensures that the unique identifier is not intercepted by an unauthorized, malicious, or otherwise unintended device, network, or system.

For example, a network parameter can comprise a network identifier or information associated with the establishment of the secure connection. The station can identify the network indicated by the network identifier and then confirm or verify that the network is actually the network indicated by the network identifier (for example, not a spoofing attempt) based on the ability to establish the secure connection. As an example, a user with a station can transition to a particular network location, such as a store with a network identifier of "STORE-A NETWORK". The station can detect that the network (or the Wi-Fi connection) claims to be the network associated with the particular network location (for example, "STORE-A NETWORK"). The station can confirm that the network identified as "STORE-A NETWORK" is correct or not subject of a vicious or malicious activity as part of a validation, such as by performing PASN. The station can send a unique identifier associated with the user and the particular network location (such as a store shopper identifier number) to the network so that the user can be provided with an enhanced or improved network experience, for example, so that the station can receive notices (such as coupons) customized for the user, any other service or feature, or any combination thereof.

Steps 1215, 1220, and 1225 are similar to or the same as steps 515, 520, and 525 as discussed with reference to FIG. 5. At step 1222, the access point can provide one or more features and/or one or more services associated with the received unique identifier from the station. For example, the unique identifier exchange module 415 of the access point 115 can facilitate the use of one or more unique identifiers so as to enable or disable one or more features provided to corresponding one or more stations 105. The one or more features can comprise any of one or more services provided by a business, an entity, and/or a network, access to a particular network (such as a public network, a private network, a secured network, a password controlled network, etc.), access to one or more benefits associated with a business or entity, receipt of push notices or messages (such as advertisements, coupons, rewards, rebates, certificates, and/or subscriptions), any other type of notice, message, or alert, or any combination thereof. As an example, the access point 115 can provide one or more benefits associated with a business (such as a retail business or an online business) or entity, for example, one or more frequent shopper benefits to a user of a station 105 based on the unique identifier received via the unsolicited unique identifier response from the station 105. As an alternative, if no unique identifier is received by the access point 115, the access point 115 can disable a service or prevent access to a service by a user of the corresponding station 105.

In one or more embodiments, step 1222 can occur prior to or after associating the station 105 to access point 115 or even if no association ever occurs. For example, the network or access point can determine that the station has been transitioned to within a range or a proximity of the network or access point such that the network can push one or more notices (such as a notice customized for the user of the station, the station, or both) to the station using one or more network protocols, one or more types of digital communications, etc. As an example, when the user transitions the station to within range of the STORE-A NETWORK, customized coupons can be sent to the station via a text message even though the station is not associated with the network or the user can be identified as present at the particular network location, such as the user is put on a list (for example, a seating waiting list at a restaurant). As another example, the user can transition the station to a network location that comprises a router provided by an internet service provider, such as a home, a residence, an office, etc., that has a private Wi-Fi network and a public/community Wi-Fi network. This access point or network does not determine the identity of the user and/or the station until the station provides the unique identifier. Once the router receives the unique identifier, the access point or network can determine the services or features associated with the station, for example, whether certain features or services are enabled or disable, or allowed or disallowed, for the station. The access point or network can determine that the station is associated with a user or a user profile. The user or the user profile can be associated with one or more features such that the one or more features provided by the access point to the station is based on the user or the user profile. The access point can provide one or more features based on this determination that the station is associated with a user profile such that the access point can enforce different policies against the station based on the user profile. For example, the access point can determine that the station is associated with a resident or employee and based on this determination the access point can allow or permit the station to connect to the private network instead of the public network.

In one or more embodiments, after associating the access point 115 and the station 105, the access point 115 can provide network information to the station 105. For example, the network information can comprise information specifying a network or a network access for the station 105. In one or more embodiments, the network information can be provided prior to or without associating the access point 115 and the station 105.

In one or more embodiments, after step 1210, any one or more of steps 715, 720, 725, 730, and 735 of FIG. 7, steps 815, 820, 825, 830, 835, 840, and 845 of FIG. 8, and steps 1015, 1020, 1025, 1030, 1035 of FIG. 10 can be performed. While the steps of FIGS. 5-10 and 12 are presented in a certain order, the present disclosure contemplates that any one or more steps can be performed simultaneously, substantially simultaneously, repeatedly, or not at all (omitted).

Figure 13:
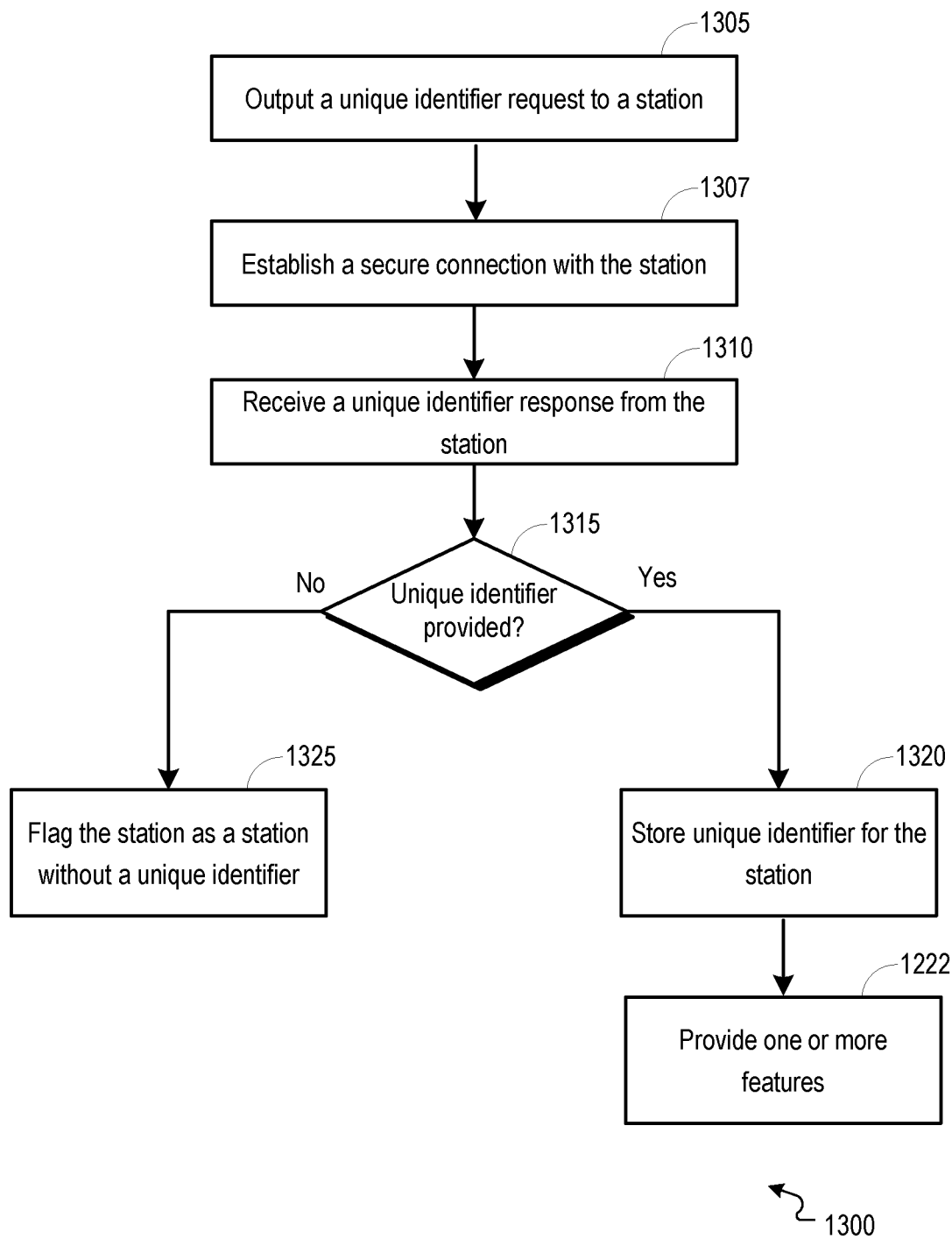
FIG. 13 is a flowchart illustrating an example process operable to facilitate the communication of a unique identifier response via a secure connection.

FIG. 13 is a flowchart illustrating an example process 1300 operable to facilitate communicating a unique identifier via a secure connection. The process 1300 begins prior to a station (for example, a station 105 of FIG. 1) associating with an access point (for example, access point 115 of FIG. 1). The unique identifier response and/or unique identifier request may be facilitated by a unique identifier exchange module 415 of FIG. 4 and/or a unique identifier exchange module 430 of station 105 of FIG. 4. The process 1300 can begin at 1305, when a unique identifier request is output to a station 105 from an access point 115.

At step 1307, a secure connection (such as any of a secured protected link, secured communication path, secure tunnel, any other secure connection, or any combination thereof) is established between the access point and the station. For example, a secure tunnel, such as a pre-association security negotiation (PASN) tunnel, can be established between the access point and the station. For example, the station 105 can determine based on the unique identifier request from the access point 115 that a secure connection should be established or is required between the access point 115 and the station 105 so that a unique identifier associated with the station 105 can be sent to the access point 115 via the secure connection. Based on this determination, the station 105 can initiate the secure connection with the access point 115 and once the secure connection is established the station 105 can send the unique identifier to the access point 115. Sending the unique identifier over the secure connection ensures that the unique identifier is not intercepted by an unauthorized, malicious, or otherwise unintended device, network, or system.

At step 1310, prior to the station 105 associating with the access point 115 and after the secure connection has been established (for example, after the station has validated that the infrastructure (such as the access point or the network) is trusted or known and/or determined unilaterally that a unique identifier for the station is available or stored at the station), the access point can receive the unique identifier response (for example, a unique identifier response 220 of FIG. 2B or 325 of FIG. 3B) from the station via the secure connection, for example, as discussed with reference to step 120 of FIG. 12. The unique identifier response comprises a unique identifier that is to be used by the access point for the station. In one or more embodiments, the station can determine that the unique identifier of or associated with the station should be sent to the access point based on the unique identifier request from the access point 115, the establishment of the secure connection, or both.

Steps 1315, 1320, and 1325 are similar to or the same as steps 515, 520, and 525 as discussed with reference to FIG. 5. At step 1322, the access point can provide one or more features associated with the received unique identifier from the station, for example, as discussed with reference to step 1222 of FIG. 12. As an example, the unique identifier exchange module 415 of the access point 115 can facilitate the use of one or more unique identifiers so as to enable or disable one or more services and/or one or more features provided to corresponding one or more stations 105. As an example, the access point 115 can provide one or more benefits associated with a business (such as a retail business or an online business) or entity, for example, one or more frequent shopper benefits, to a user of a station 105 based on the unique identifier received via the unsolicited unique identifier response from the station 105. As an alternative, if no unique identifier is received by the access point 115, the access point 115 can disable a service or prevent access to a service by a user of the corresponding station 105. For example, at step 1322, the access point 115 can associate the station 105 with the access point 115, determine that the station 105 should be within the network and facilitate connectivity to the network, determining that the station 115 should not be within the network, provide access to a service or feature associated with an application or a network resource, such as a frequent shopper service, provide an enabled or disabled access to any one or more services or one or more features, or any combination thereof.

In one or more embodiments, after step 1310, any one or more of steps 715, 720, 725, 730, and 735 of FIG. 7, steps 815, 820, 825, 830, 835, 840, and 845 of FIG. 8, and steps 1015, 1020, 1025, 1030, 1035 of FIG. 10 can be performed.

While the steps of FIGS. 5-10 and 12-13 are presented in a certain order, the present disclosure contemplates that any one or more steps can be performed simultaneously, substantially simultaneously, repeatedly, or not at all (omitted).

Figure 14:
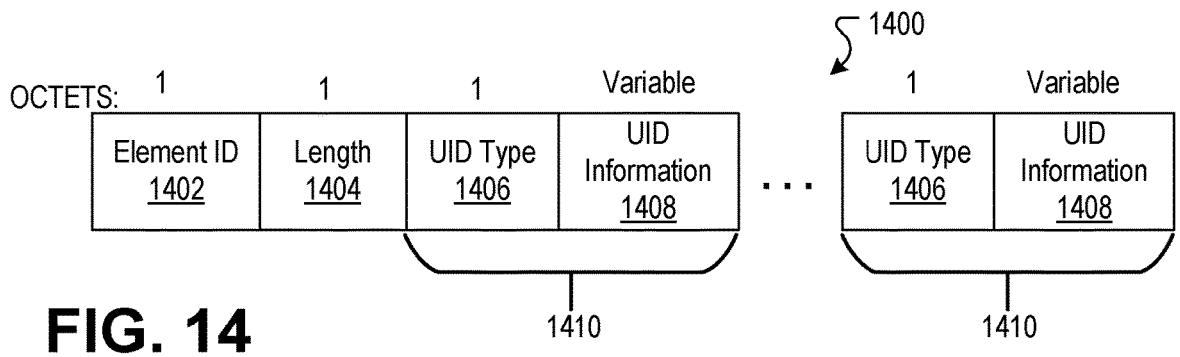
FIG. 14 is a block diagram of an informational element of a frame that indicates support for or requirement of a unique identifier.

FIG. 14 illustrates a block diagram of an informational element 1400 of a frame that indicates support for and/or requirement of a unique identifier along with information associated with the unique identifier. The informational element 1400 provides information about one or more unique identifier types supported by the network or associated access point. For example, the informational element 1400 can be broadcast by an access point of a Wi-Fi network so as to provide information to one or more stations 105 of the network pre-association. A station 105 can then, for example, based on the information element 1400 broadcast by the access point pre-association determine whether to request access to the network and/or to associate with the access point. The informational element 1400 can be included in or as part of any one or more responses and/or frames by an access point 115, such as any of a beacon, a probe response, an association response, any other applicable type of frame sent by the access point 115 to a station 105, or any combination thereof. For example, per Section 9.4.2.1 of the International Electrical and Electronics Engineers (IEEE) 802.11 (2020) standard, the general format of an informational element includes specific fields, such as an element identifier (ID) field, a length field, an element ID extension field, and an information field. To enhance the use of a unique identifier, the informational element 1400 is the same as or similar to the informational element of the IEEE 902.11 (2020) standard, for example, except the informational element 1400 expands the use of the element ID extension and information fields to provide one or more types of unique identifiers and unique identifier information associated with each type of unique identifier required or supported by the network, for example, a unique identifier type as discussed with reference to FIGS. 15-17. The informational element 1400 indicates the one or more types of unique identifiers that are supported, required, or both by the network. In one or more embodiments, the informational element 1400 indicates that a unique identifier is required prior to being provided access to the network.

As illustrated in FIG. 14, the informational element 1400 comprises a plurality of fields with each field, for example, having a length of one or more octets, such as an element ID 1402 (for example, with a length of one octet), a length 1404 (for example, with a length of one octet), and one or more unique identifier (UID) configurations 1410 that each comprise a unique identifier (UID) type 1406 (for example, with a length of one octet), and a UID type information 1408 (for example, with a variable octet length). The element ID 1402 is the same as or similar to the element ID field of the informational element provided in the IEEE 802.11 standard. The element ID 1402 identifies the element as provided or otherwise assigned in the IEEE 802.11 standard. The length 1404 is the same as or similar to the length field of the informational element provided in the IEEE 802.11 standard. The length field indicates the number of octets in the information element 1400 excluding the element ID 1402 and the length 1404. The unique identifier type 1406 is the same as or similar to the element ID extension field of the informational element provided in the IEEE 802.11 standard. The unique identifier type 1406 comprises a value indicative of the type of unique identifier required by the network including, but not limited to, any of a text-based type, a hash-based type, a certificate-based type, any other type of unique identifier, or any combination thereof. The unique identifier type 1406 can comprise a text string, a numerical value, or both to indicate the type of unique identifier supported. The unique identifier information 1408 comprises one or more octets that provide information associated with the unique identifier supported by the network and/or provided by the station 105, for example, as discussed with reference to FIGS. 15-17. For example, the UID information 1408 can comprise a UID length parameter that indicates a maximum length of a unique identifier that is supported.

Figure 15:
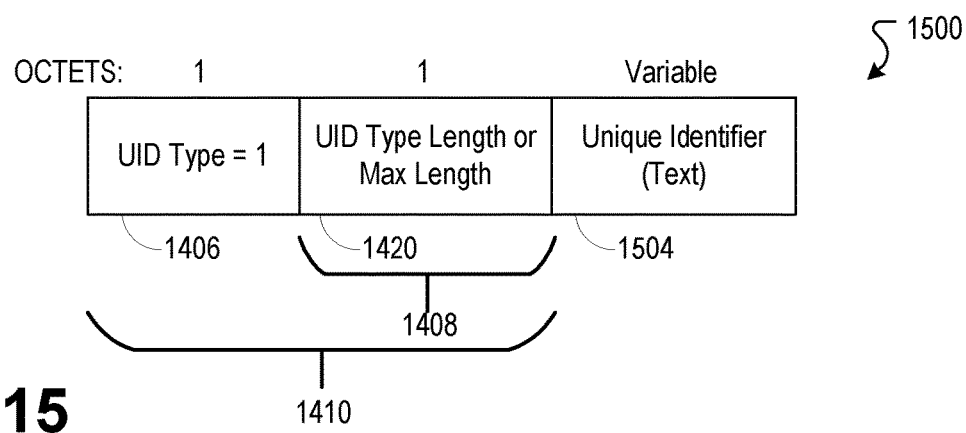
FIG. 15 is a block diagram of an example text-based unique identifier element operable to facilitate providing a station access to a network that requires use of a unique identifier.

FIG. 15 is a block diagram of an example text-based unique identifier element 1500 operable to facilitate providing a station 105 access to a network that supports and/or requires use of a text-based unique identifier also referred to as a private identifier. As an example, text-based unique identifier element 1500 illustrates a generic field which is utilized differently based on context of use. The text-based unique identifier element 1500 can, for example, be used in conjunction with FIG. 14 and/or FIG. 18 so as to provide information about the network and/or an access point of the network, such as support for a text-based unique identifier, a maximum length which can be returned from a station, or both.

The text-based unique identifier element 1500 comprises a unique identifier configuration 1410, as discussed with reference to FIG. 14, and a text-based unique identifier 1504. The text-based unique identifier 1504 is returned in or as part of a frame, for example, a unique identifier query response action frame 1900, otherwise the text-based unique identifier 1504 is not included as part of an informational element 1400 of FIG. 14 and/or a unique identifier request action frame 1800 of FIG. 18. The unique identifier type 1406 comprises a value that indicates that the type of unique identifier, such as the type of unique identifier supported, required, or both by the network and/or provided by a station 105 is a text-based type unique identifier. For example, the unique identifier type 1406 can comprise any of a value, a text string, an expression, any other indicator, or any combination thereof indicative of a text-based unique identifier. As an example, the unique identifier type 1406 can comprise a value of "1" to indicate a text-based unique identifier.

The unique identifier information 1408 for this type of unique identifier can comprise a unique identifier type length or maximum length 1420. For example, the unique identifier type length or maximum length 1420 in the context of FIG. 14 and/or FIG. 18 can convey to a station, or otherwise inform a station of, the maximum length text-based unique identifier that the station can return to an access point when used as part of or included in a frame, such as illustrated in FIG. 19. The unique identifier type length or maximum length 1420 of the text-based unique identifier element 1500 that is part of or included in a frame, such as the frame illustrated in FIG. 19, can be sent from a station to an access point so as to convey an actual length of the included text-based unique identifier 1504.

Figure 17:
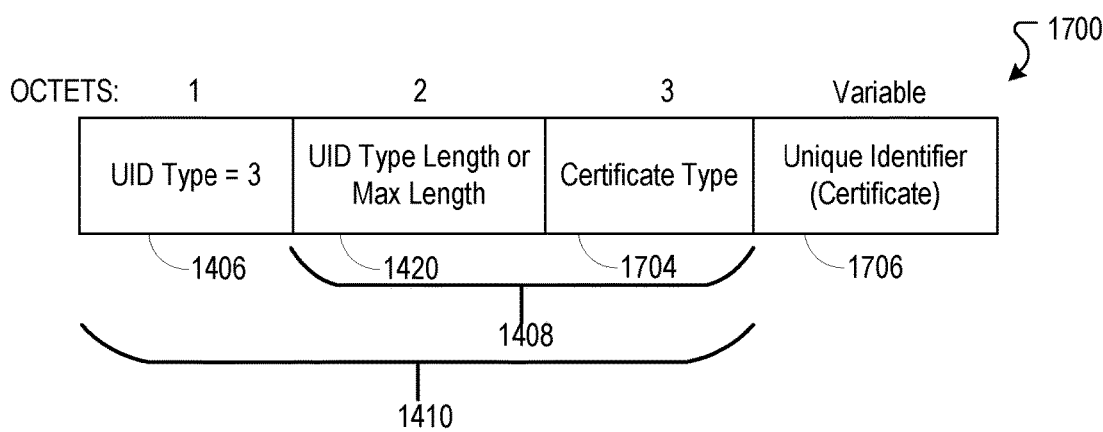
FIG. 17 is a block diagram of an example certificate-based unique identifier element operable to facilitate providing a station access to a network that requires use of a unique identifier.
Figure 18:
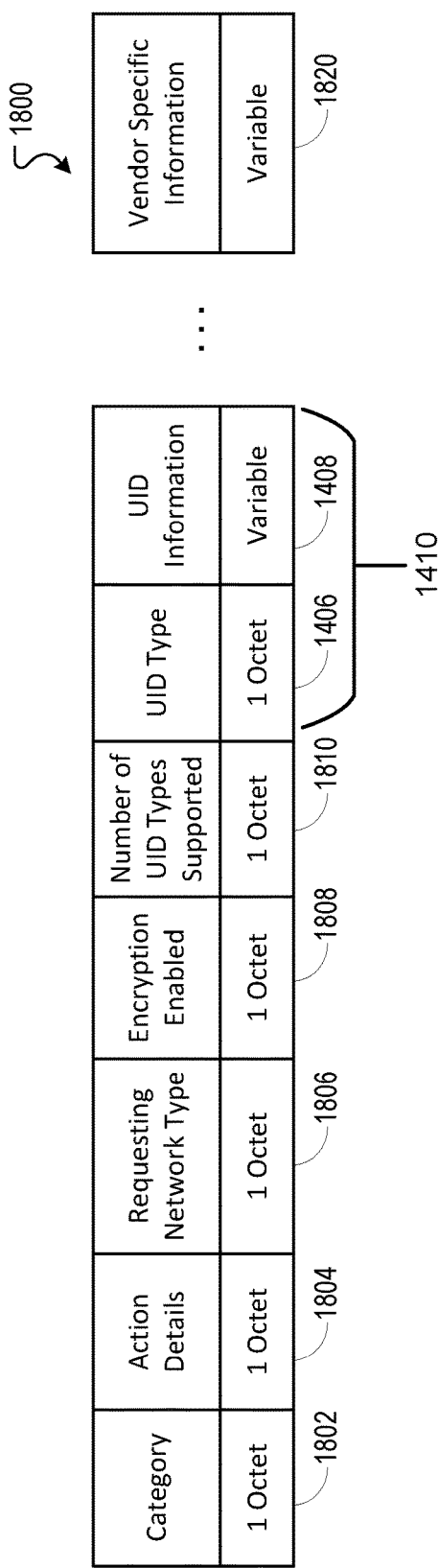
FIG. 18 is a block diagram of an example unique identifier request action frame.
Figure 19:
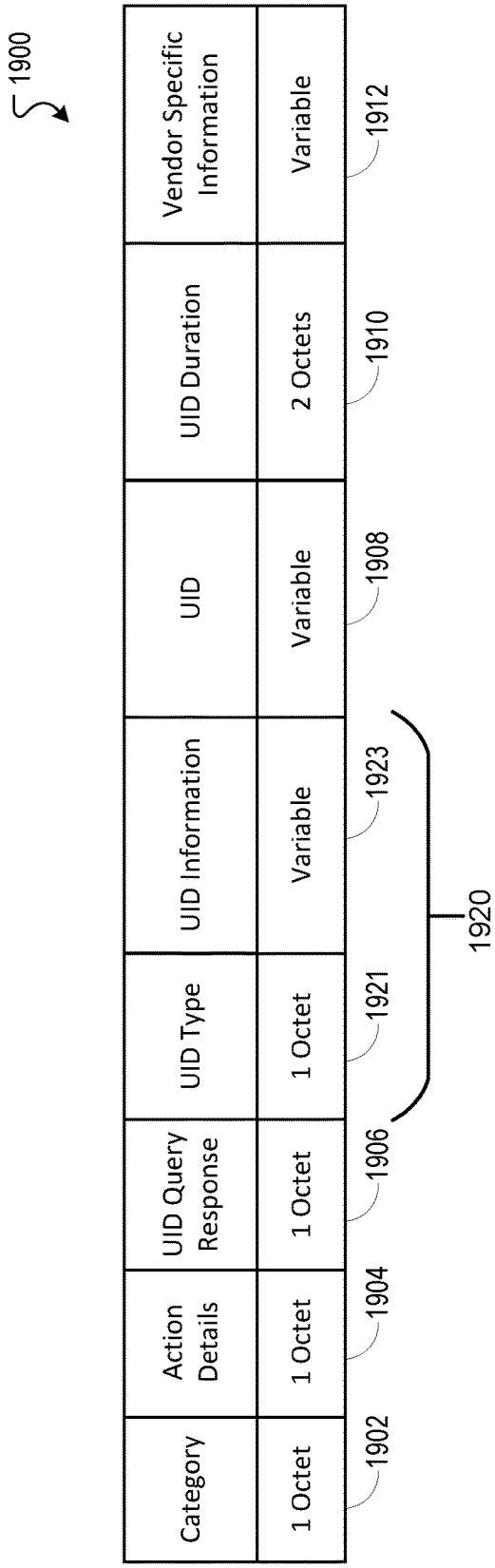
FIG. 19 is a block diagram of an example unique identifier query response action frame.

The unique identifier type length 1420 can comprise a value indicative of the length in octets of the type of unique or private identifier supported by the network and/or an access point of the network in FIG. 14 and/or FIG. 18, for example, a value of "n" that indicates an actual supported length of the unique identifier as n octets, where "n" can represent any value, such as a value within a range of 0-65533. If this length 1420 (for example, as discussed with reference to FIGS. 15-17) does not meet the length required and/or supported by the access point 115, the station 105 can be denied access to the network as failing to meet the unique identifier requirements set forth in the information element 1400 or as discussed with reference to FIG. 18. The text-based unique identifier 1504 comprises a unique identifier, for example, in a frame as illustrated in FIG. 19, with the maximum length, conveyed in a frame such as illustrated in FIG. 14 and/or FIG. 18. For example, the text-based unique identifier 1504 can comprise a unique identifier that is of a length per UTF-8 (universal character set+transformation format—8-bit) encoded bytes. In one or more embodiments, the text-based unique identifier 1504 is constrained by a required length, a minimum length, a maximum length, or any other length for a text-based unique identifier type 1406. The return of a unique identifier from a station 105 to an access point 115 is discussed with reference to FIG. 19.

Figure 16:
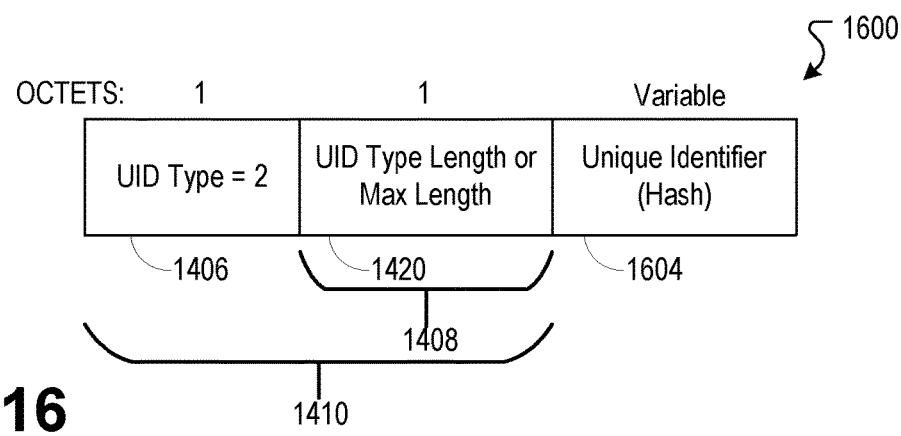
FIG. 16 is a block diagram of an example hash-based unique identifier element operable to facilitate providing a station access to a network that requires use of a unique identifier.

FIG. 16 is a block diagram of an example hash-based unique identifier element 1600 operable to facilitate providing a station 105 access to a network that requires use of a hash-based unique identifier. As an example, hash-based unique identifier element 1600 illustrates a generic field which is utilized differently based on context of use. The hash-based unique identifier element 1600 can, for example, be used in conjunction with FIG. 14 and/or FIG. 18 so as to provide information about the network and/or an access point of the network, such as support for a hash-based unique identifier, a maximum length which can be returned from the station, or both.

The hash-based unique identifier element 1600 comprises a unique identifier configuration 1410, as discussed with reference to FIG. 14, and a hash-based unique identifier 1604. The hash-based unique identifier 1504 is returned in or as part of a frame, for example, a unique identifier query response action frame 1900, otherwise the hash-based unique identifier 1604 is not included as part of an informational element 1400 of FIG. 14 and/or a unique identifier request action frame 1800 of FIG. 18. The unique identifier type 1406 comprises a value that indicates that the type of unique identifier, such as the type of unique identifier supported, required, or both by the network and/or provided by a station 105 is a hash-based type unique identifier. For example, the unique identifier type 1406 can comprise any of a value, a text string, an expression, any other indicator, or any combination thereof indicative of a hash-based unique identifier. As an example, the unique identifier type 1406 can comprise a value of "2" to indicate that a hash-based unique identifier is required.

The unique identifier information 1408 for this type of unique identifier can comprise a unique identifier type length 1420. For example, the unique identifier type length or maximum length 1420 in the context of FIG. 14 and/or FIG. 18 can convey to a station, or otherwise inform a station of, the maximum length hash-based unique identifier that the station can return to an access point when used as part of or included in a frame, such as illustrated in FIG. 19. The unique identifier type length or maximum length 1420 of the hash-based unique identifier element 1600 that is part of or included in a frame, such as the frame illustrated in FIG. 19, can be sent from a station to an access point so as to convey an actual length of the included hash-based unique identifier 1604.

The unique identifier type length 1420 can comprise a value indicative of the length in octets of the type of private or unique identifier supported by the network and/or an access point of the network in FIG. 14 and/or FIG. 18, for example, a value of "n" that indicates an actual supported length of the hash-based unique identifier as n octets, where "n" can represent any value, such as a value within a range of 0-255. The text-based unique identifier 1504 comprises a unique identifier, for example, in a frame as illustrated in FIG. 19, with the maximum length, conveyed in a frame such as illustrated in FIG. 14 and/or FIG. 18. The hash-based unique identifier 1604 comprises a unique identifier, for example, in a frame as illustrated in FIG. 19, with the maximum length, conveyed in a frame such as illustrated in FIG. 14 and/or FIG. 18. For example, the hash-based unique identifier 1604 can comprise a unique identifier based on the number of octets returned from a hash algorithm used to generate the unique identifier. In one or more embodiments, the hash-based identifier 1604 is constrained by a required length, a minimum length, a maximum length, or any other length for a hash-based unique identifier.

FIG. 17 is a block diagram of an example certificate-based unique identifier element 1700 operable to facilitate providing a station 105 access to a network that requires use of a certificate-based unique identifier. As an example, certificate-based unique identifier element 1700 illustrates a generic field which is utilized differently based on context of use. The certificate-based unique identifier element 1700 can, for example, be used in conjunction with FIG. 14 and/or FIG. 18 so as to provide information about the network and/or an access point of the network, such as support for a text-based unique identifier, a maximum length which can be returned from a station, or both.

The certificate-based unique identifier element 1700 comprises a unique identifier configuration 1410, as discussed with reference to FIG. 14, and a certificate-based unique identifier 1706. The certificate-based unique identifier 1706 is returned in or as part of a frame, for example, a unique identifier query response action frame 1900, otherwise the certificate-based unique identifier 1706 is not included as part of an informational element 1400 of FIG. 14 and/or a unique identifier request action frame 1800 of FIG. 18. The unique identifier type 1406 comprises a value that indicates that the type of unique identifier supported, required, or both by the network and/or provided by a station 105 is a certificate-based type unique identifier. For example, the unique identifier type 1406 can comprise any of a value, a text string, an expression, any other indicator, or any combination thereof indicative of a text-based unique identifier. As an example, the unique identifier type 1406 can comprise a value of "3" to indicate that a certificate-based unique identifier is required.

The unique identifier information 1408 for this type of unique identifier can comprise a unique identifier type length 1420 and a certificate type 1704. For example, the unique identifier type length or maximum length 1420 in the context of FIG. 14 and/or FIG. 18 can convey to a station, or otherwise inform a station of, the maximum length certificate-based unique identifier that the station can return to an access point when used as part of or included in a frame, such as illustrated in FIG. 19. The unique identifier type length or maximum length 1420 of the certificate-based unique identifier element 1700 that is part of or included in a frame, such as the frame illustrated in FIG. 19, can be sent from a station to an access point so as to convey an actual length of the included certificate-based unique identifier 1706.

The unique identifier type length 1420 can comprise a value indicative of the length in octets of the type of unique or private identifier supported by the network and/or an access point of the network in FIG. 14 and/or FIG. 18, indicated by the unique identifier type 1406, for example, a value of "n" that indicates an actual supported length of the certificate-based unique identifier as is n octets, where "n" can represent any value, such as a value within a range of 0-65533. The certificate-based unique identifier 1706 comprises a unique identifier, for example, in a frame as illustrated in FIG. 19, with the maximum length, conveyed in a frame such as illustrated in FIG. 14 and/or FIG. 18. As an example, the unique identifier type length 1420 can indicate that the certificate-based unique identifier has a length of four octets, such as three octets for the certificate type 1704 and one octet for the certificate-based unique identifier 1706. The certificate type 1704 can have or require a length, for example, of three octets and is indicative of one or more types of certificates that are supported, required, or both by the network. For example, the certificate type 1704 can comprise a three character representation of each type of certificate supported, required, or both by the network, such as X509, SSL, etc. The certificate-based unique identifier 1706 comprises a unique identifier of a certificate. For example, the certificate-based unique identifier 1706 can comprise a unique identifier based on the certificate type 1704. In one or more embodiments, the certificate-based unique identifier 1706 is constrained by a required length, a minimum length, a maximum length, or any other length for a certificate-based unique identifier.

While FIGS. 15-17 indicate specific types of unique identifiers required by a network, the present disclosure contemplates that the informational element 1400, as an extension of the informational element as provided in the IEEE 802.11 standard, can indicate any type of unique identifier that can be required by a network, including, but not limited to, any combination of types of unique identifiers.

FIG. 18 is a block diagram of an example unique identifier query request action frame 1800, for example, an action frame as discussed with reference to FIGS. 1, 2A and 2B. To identify and/or provide one or more types of unique identifiers (also referred to as one or more private identifiers) supported and/or required by a network, one or more types of action frames can be utilized. For example, an access point 115 can broadcast or otherwise advertise to a station 105 a frame, for example, an informational element 1400 as discussed with reference to FIG. 14, that indicates the type of unique identifier supported by the network and/or the access point 115, any other information associated with the unique identifier supported by the network and/or the access point 115, or both. As an example, prior to associating with a station 105 or pre-association, an access point 115 can send or broadcast an informational element 1400 as part of a frame that indicates support for and/or requirement of a unique identifier along with information associated with the unique identifier. After associating with a station 105, an access point 115 can send an action frame to an associated station 105 that comprises a unique identifier query request action frame 1800 as illustrated in FIG. 18 so as to inform or provide the one or more requirements for a unique identifier, such as the one or more types of unique identifiers supported and/or required by the network.

A unique identifier query request action frame 1800 can comprise a plurality of fields with each field having a length, such as any of a category 1802 (for example, with a one octet length), an action details 1804 (for example, with a one octet length), a requesting network type 1806 (for example, with a one octet length), an encryption enabled 1808 (for example, with a one octet length), a number of UID types supported 1810 (for example, with a one octet length), one or more unique identifier configurations 1410 that comprise a unique identifier type 1406 (for example, with a one octet length), a unique identifier information 1408 (for example, with a variable length), or both, and a vendor specific information 1820 (for example, with a variable octet length), or any combination thereof. The category 1802 can indicate that the action frame is a unique identifier action frame, such as a unique identifier set action frame 2500 of FIG. 25, a unique identifier query response action frame 2400 of FIG. 24, a unique identifier query request action frame 2300 of FIG. 23, a unique identifier query request action frame 1800, or a unique identifier query response action frame 1900 of FIG. 19. The action details 1804 can indicate that the category 1802 is associated with an action frame that is a set action frame (such as unique identifier set action frame 2500), a request action frame (such as unique identifier query request action frame 1800 or a unique identifier query request action frame 2300) or a response action frame (such as unique identifier query response action frame 1900 or a unique identifier query response action frame 2400). Requesting network type 1806 can indicate, for example, a bitmap of a type of network, such as a private network, a hotspot, etc. Encryption enabled 1808 can indicate whether encryption is enabled for this network. Number of unique identifier types supported 1810 can indicate the number of different types of unique identifiers that are supported by an access point, a cell, the network, or any combination thereof, for example, as indicated by the one or more unique identifier configurations 1410. The one or more unique identifier configurations 1410 can comprise, for example, the unique identifier type 1406 and unique identifier information 1408 associated with a unique identifier such as any of the unique identifier configuration 1410 discussed with reference to any of FIGS. 15-17, any other type of unique identifier, or any combination thereof. As indicated by the ellipses in FIG. 18, any number of unique identifier configurations 1410 can be supported and/or required. Vendor specific information 1816 can, for example, allow a vendor to place additional information into a frame.

Figure 23:
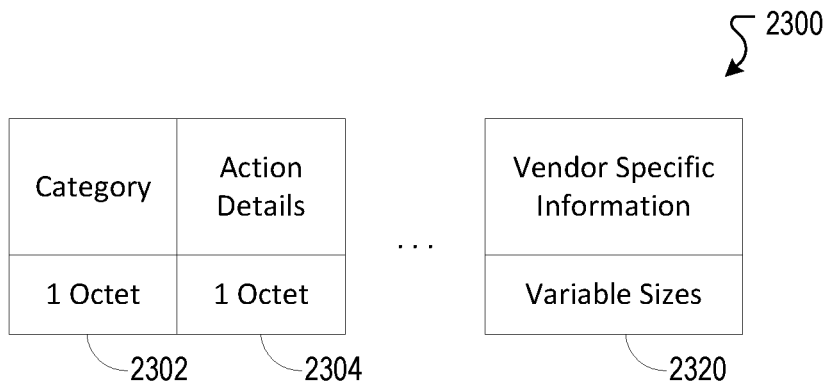
FIG. 23 is a block diagram of an example unique identifier query request action frame.

FIG. 23 is a block diagram of an example unique identifier query request action frame 2300. The unique identifier query request action frame 2300 is similar to the unique identifier query request action frame 1800 of FIG. 18. The unique identifier query request action frame 2300 is an action frame sent by an access point 115 to station a 105 so as to request a unique identifier from the station for this network. The unique identifier query request action frame 2300 can comprise a category 2302 (similar to or the same as category 1802) that indicates this is a private identifier action frame for a request (a value of "1"), an action details 2304 (similar to or the same as action details 1804) that indicates a use of the frame as a "unique identifier request", a vendor specific information 2320 (similar to or the same as vendor specific information 1820). While FIG. 23 illustrates certain fields, the present disclosure contemplates that the unique identifier query request action frame 2300 comprises any other one or more fields, such as one or more fields of FIG. 18.

FIG. 19 is a block diagram of an example unique identifier query response action frame 1900. A station 105 can in response to an action frame from an access point 115, for example, a unique identifier query request action frame 1800 or a unique identifier query response action frame 2400, send a responsive action frame to the access point 115 via a secure connection, such as a unique identifier query response action frame 1900. The unique identifier query response action frame 1900 can comprise a category 1902 (for example, with a length of one octet) 1902, an action details 1904 (for example, with a length of one octet), a unique identifier query response 1906 (for example, with a length of one octet), a response unique identifier configuration 1920 (for example, that comprises the same or similar information as the unique identifier configuration 1410 such as a response unique identifier type 1921 (which can correspond to the unique identifier type 1406 of FIG. 14) (for example, with a length of one octet) and a response unique identifier information 1923 (which can correspond) to unique identifier information 1408 of FIG. 14 (for example, with a variable octet length), a unique identifier 1908 (with a variable length), a unique identifier duration 1910 (for example, with a two octet length), and a vendor specific information 1912 (for example, with a variable length).

The category 1902 and the action details 1904 can be the same or similar to the category 1802 and action details 1804 as discussed with reference to FIG. 18. The UID query response 1906 can indicate that the frame is a UID response action frame. The response unique identifier configuration 1920 can comprise, for example, the response unique identifier type 1921 and the response unique identifier information 1923 associated with a unique identifier 1908 which correspond to the unique identifier configuration 1410 discussed with reference to any of FIGS. 15-17, any other type of unique identifier, or any combination thereof.

The unique identifier 1908 can be a unique identifier as discussed with reference to any of text-based unique identifier 1504, hash-based unique identifier 1604, certificate-based unique identifier 1706, any other unique identifier, or any combination thereof. The unique identifier 1908 is a unique identifier (also referred to as a private identifier) generated based on the response unique identifier type 1921 with a length as indicated by the response unique identifier type length of the response unique identifier information 1923. The unique identifier duration 1910 indicates the timeframe that a unique identifier 1907 is valid. For example, the unique identifier duration 1910 can represent any value time, such as any of a range of time, a time measurement, time interval, one or more units of time, or any combination thereof. The unique identifier duration 1909 can be represented as any of a number of seconds, minutes, hours, weeks, days of weeks, months, years, etc., or any combination thereof. The vendor specific information 1912 can allow a vendor to place additional information in the frame.

Figure 24:
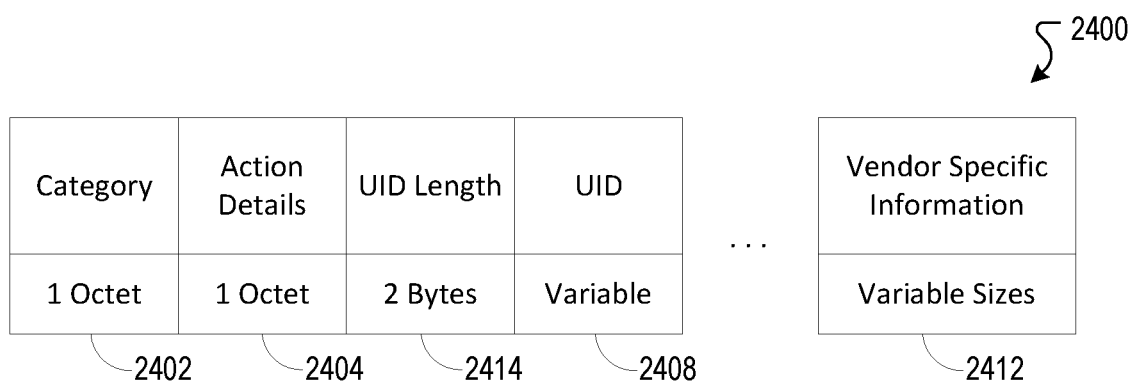
FIG. 24 is a block diagram of an example unique identifier query response action frame.

FIG. 24 is a block diagram of an example unique identifier query response action frame 2400. The unique identifier query response action frame 2400 is similar to the unique identifier query response action frame 1900 of FIG. 19. The unique identifier query response action frame 2400 is an action frame that a station 105 sends to an access point 115 so as to indicate that the station 105 has set a unique identifier for the current network. The unique identifier query response action frame 2400 comprises a category 2402 (similar to or the same as category 1902) that indicates that this is a private identifier action frame for a response (a value of "2"), an action details 2404 (similar to or the same as action details 1904) that indicates a use of the frame as a unique identifier response, a unique identifier length 2414 (similar to or the same as the UID information 1923) that indicates a length of the unique identifier 2408, the unique identifier set in the station for this network 2408 and possibly vendor specific information 2412 (similar to or the same as vendor specific information 1912). While FIG. 24 illustrates certain fields, the present disclosure contemplates that the unique identifier query response action frame 2400 comprises any other one or more fields, such as one or more fields of FIG. 19. In one or more embodiments, a station 105 can send an acknowledgment, for example, instead of a unique identifier query response action frame 2400, to the access point 115 that indicates that the unique identifier set action frame 2500 has been received and the unique identifier has been set by the station 105.

Figure 25:
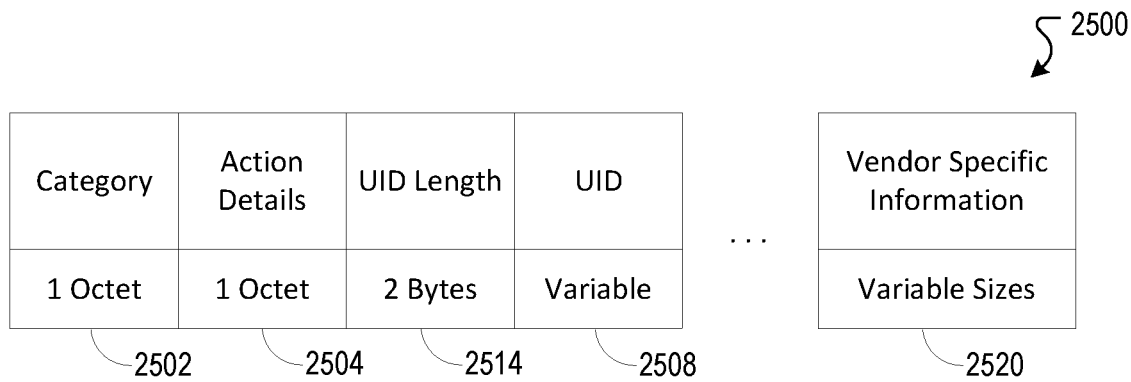
FIG. 25 is a block diagram of an example unique identifier set action frame.

FIG. 25 is a block diagram of an example unique identifier set action frame 2500. The unique identifier set action frame 2500 can comprise one or more fields similar to or the same as unique identifier query request action frame of 1800 of FIG. 18. The unique identifier set action frame 2500 is an action frame sent by an access point 115 to a station 105 to cause the station 105 to set a unique identifier for this network. The unique identifier set action frame comprises a category 2502 (similar to or the same as category 1802) that indicates this is a private identifier action frame (a value of "3"), an action details 2504 field that indicates a use of the frame as "a unique identifier set", a unique identifier length 2514 (similar to or the same as unique identifier information 1408) that indicates a length of the unique identifier 2508, the unique identifier being set in the station for this network 2508 and possibly vendor specific information 2520 (similar to or the same as vendor specific information 1820). The unique identifier set action frame 2500 can contain a duration of time associated with the unique identifier such that the access point 115 can only use the unique identifier the station for the duration of time. While FIG. 25 illustrates certain fields, the present disclosure contemplates that the unique identifier set action frame 2500 comprises any other one or more fields, such as one or more fields of FIG. 18.

Figure 20:
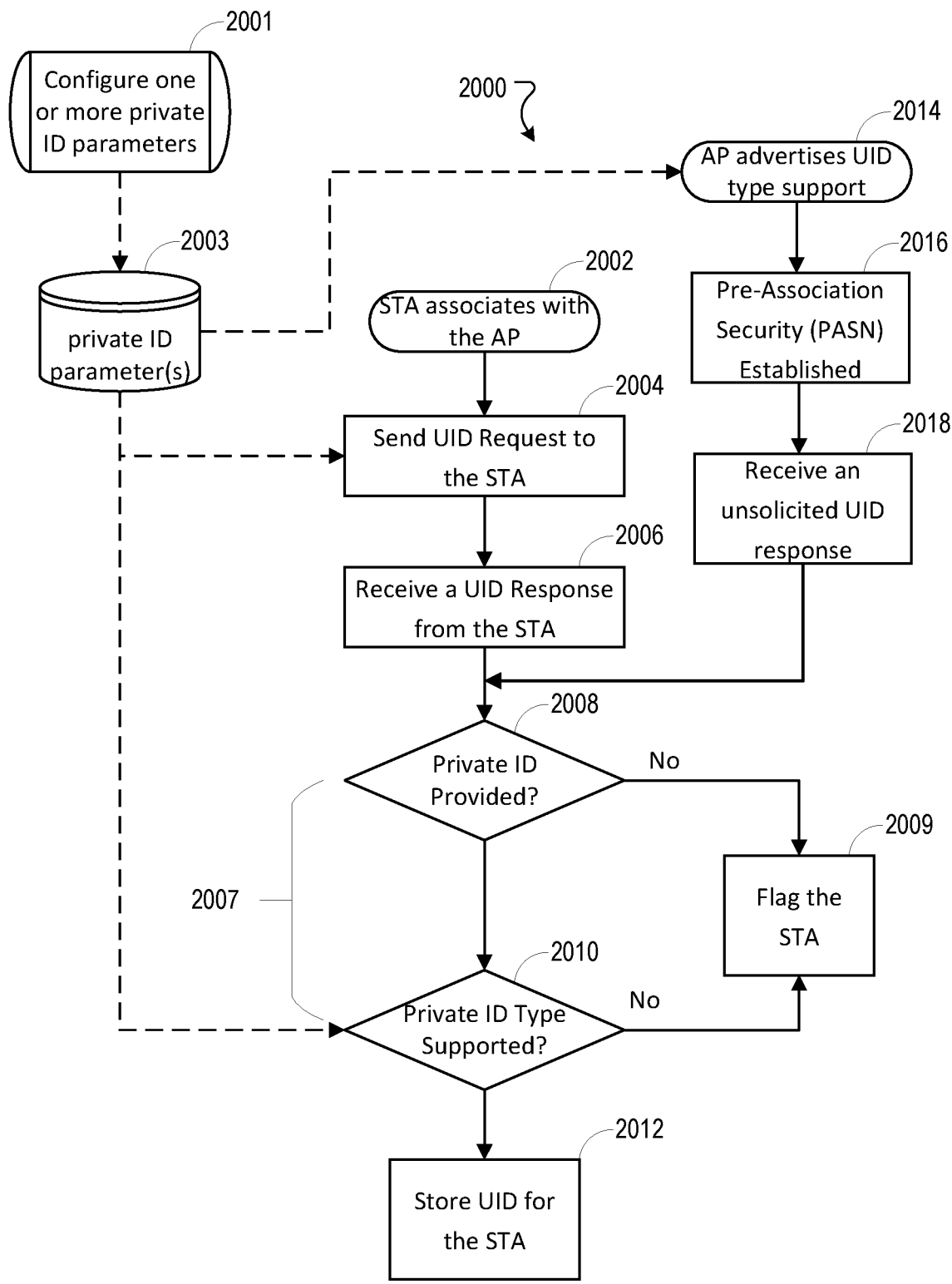
FIG. 20 is a flow diagram of an access point determining whether a unique identifier type provided by a station is supported by the access point.

FIG. 20 is a flow diagram of an access point determining whether a unique identifier type provided by a station is supported by the access point. Prior to the process 2000, at step 2001 one or more unique identifier requirements associated with a unique identifier (also referred to as a private identifier) are configured, for example, the one or more identifier types, the associated one or more maximum lengths, or both that are supported are set. In one or more embodiments, the one or more unique identifier requirements can be used to configure the one or more types of certificates and associated maximum lengths that are supported for a certificate-based unique identifier. The one or more unique identifier requirements can comprise a category 1802, an action details 1804, a requesting network type 1806, an encryption enabled 1808, a number of unique identifier types supported 1810, one or more unique identifier configurations 1410, a vendor specific information 1816, any other information associated with the unique identifier, the network, or both, or any combination thereof.

At step 2003, the unique identifier requirements can be stored, for example, in any of a memory, a database, any other storage location, or any combination thereof. For example, a network can support a text-based unique identifier (such as with a maximum length of 64 bytes), a hash-based unique identifier (such as with a maximum length of 128 bytes), a certificate-based unique identifier, for example, a qualified digital certificate (QDC) (such as with a length of 4096 bytes), or any combination thereof. Once the one or more types of unique identifier is configured along with associated information (such as the maximum length), the one or more configurations can be stored, such as in a database, and used as discussed with reference to FIG. 14 and/or FIG. 18. The database can be at or as part of any of the access point 115, such as any of a unique identifier data store 420, a data storage unit 1130, a memory 1120, or any combination thereof, a database connected to a provider network 120 and/or WAN 125, or any combination thereof.

The process can begin at step 2002 and/or step 2014. At step 2014, the access point 115 can advertise a unique identifier type supported. For example, the access point 115 can transmit one or more unique identifier types to a station 105, for example, based on one or more unique identifier requirements received from a network resource (such as a database, a server, any other storage location, or any combination thereof). For example, the access point 115 can transmit a frame that comprises an informational element 1400 as discussed with reference to FIG. 14 during a pre-association phase, such as prior to the station 105 associating with the access point 115. A pre-association security (PASN) context can be established at step 2016. For example, the station 105 can establish a PASN with the access point 115 prior to an association as discussed with reference to step 2002. At step 2018, the access point 115 can receive an unsolicited unique identifier response from the station 105, for example, an unsolicited unique identifier query response action frame 1900 as discussed with reference to FIG. 19, an unsolicited unique identifier response discussed with reference to the process 1200 of FIG. 12, or both, via the secure connection established at step 2016. The process then continues at step 2008.

At step 2002, a station 105 associates with an access point. In one or more embodiments, the station 105 can determine whether to associate with the access point 115 based on an advertised unique identifier type support as discussed with reference to step 2014.

At step 2004, the access point 115 outputs or sends a unique identifier request (for example, an action frame, such as a unique identifier query request action frame 1800) to the station 105. The unique identifier query request action frame 1800 can be based on one or more unique identifier requirements stored at step 2003. For example, the access point 115 can receive one or more unique identifier support requirements in response to a query to any of a network resource, a database, any other storage location, or any combination thereof. The unique identifier request action frame 1800 can include a request that the station 105 respond with a unique identifier, for example, as part of or included in a unique identifier query response action frame 1900, that is to be used by the access point 115 for the station 105. The unique identifier request action frame 1800 can comprise a unique identifier configuration 1410 supported by the access point 115, such as one or more unique identifier types, one or more unique identifier maximum lengths (for example, that correspond respectively to the one or more supported unique identifier types), or both that are supported by the access point or required for access to the one or more features provided by the access point 115 and/or the network, for example, as discussed with reference to FIGS. 15-17. For example, the one or more unique identifier types 1406 supported by the access point 115 can comprise any of a text-based type unique identifier of FIG. 15, a hash-based type unique identifier of FIG. 16, a certificate-based type unique identifier of FIG. 17, or any combination thereof.

At step 2006, the access point 115 receives a unique identifier response, such as a unique identifier query response action frame 1900 from the station 105. For example, the station 105 can provide the unique identifier query response action frame to the access point 115 via a secure connection so as to obtain access to one or more features associated with the access point 115. The station 105 can send the unique identifier query response action frame 1900 based on a received unique identifier request action frame 1800. The access point 115 will receive the unique identifier query response action frame 1900 and subsequently process the unique identifier query response action frame 1900. The unique identifier query response action frame 1900 can comprise any one or more elements as discussed with reference to FIG. 19, such as any of a unique identifier 1908, a response unique identifier configuration 1920 (for example, that comprises a response unique identifier type 1921 associated with the unique identifier 1908, a response unique identifier information 1923, or both), any other element as discussed with reference to FIG. 19, or any combination thereof.

At step 2007, the access point can compare unique identifier configuration 1410 of the unique identifier request action frame 1800 to a response unique identifier configuration 1920 of the unique identifier request query response action frame 1900 and then based on the comparison, determine an authorization of the station 105. For example, the station 105 can access one or more features based on any information provided in the response unique identifier request action frame 1800, such as any of the unique identifier, the response unique identifier type, the response unique identifier length, or any combination thereof as per the authorization of the access point 115. Step 2007 can comprise any of steps 2008-2010.

At step 2008, the access point 115 determines if a unique identifier is provided in a unique identifier query response action frame 1900, received at step 2006 or step 2018. For example, the access point 115 can parse a received unique identifier query response action frame 1900 for a unique identifier 1908, a response unique identifier configuration 1920 that can comprise a response unique identifier type 1921, a response unique identifier information 1923, or both. The response unique identifier information 1923 can correspond to the unique identifier information 1408 as discussed above. For example, the unique identifier information 1923 can correspond to and/or include the same or similar information as the unique identifier information 1408 discussed with reference to FIGS. 15-17. As an example, the access point 115 can compare a unique identifier configuration 1410 of the access point 115 (for example, as included within a unique identifier request action frame 1800) with a response unique identifier configuration 1910 of a station 105 (for example, as include within a unique identifier query response action frame 1900). The comparing can comprise determining that a response unique identifier type 1921 of a unique identifier configuration 1920 matches at least one of the one or more unique identifier types 1406 of a unique identifier configuration 1410, determining that a response unique identifier information 1923 (for example, a response unique identifier maximum length) of a response unique identifier configuration 1920 matches a unique identifier information 1408 (for example, one or more unique identifier maximum lengths) of a unique identifier configuration 1410, or both.

If the access point 115 determines that a unique identifier was not provided in the unique identifier response, the process continues at step 2009 where the access point 115 flags the station 105 as not supporting the one or more unique identifier requirements set forth in, for example, the informational element 1400 of FIG. 14. For example, the station 105 can be added to a non-unique identifier list or otherwise identified as a station 105 that does not support the required type of unique identifier for access to the network or otherwise flagged, such as discussed with reference to step 525 of FIG. 5. In one or more embodiments, the station 105 can be flagged as supporting a unique identifier and added to a unique identifier list.

If at step 2008, the access point 115 determines that a unique identifier was provided, then at step 2010, the access point 115 determines if the provided, for example, unique identifier type 1921 from the station 105 matches that required or supported by the network or access point 115.

For example, the access point 115 can parse the unique identifier response action frame 1900 for a response unique identifier configuration 1920 (such as a unique identifier type 1921 and a unique identifier information 1923). If the access point 115 determines that the response unique identifier type 1921, the response unique identifier information 1923 (such as the response unique identifier length) provided by the station 105 is not supported by the network or access point 115, then the process continues to step 2009 and the process continues as discussed above. If the access point 115 determines that the response unique identifier type 1921, the response unique identifier information 1923 (such as the response identifier length), or both is supported the station is authorized, then the access point 115 can provide access to the one or more features to the station 105 based on the authorization. Then at step 2012 the access point 115 stores the unique identifier of the unique identifier response (for example, the unique identifier 1907 of the unique identifier query response action frame 1900) received from the station 105. For example, the access point 115 can store the unique identifier associated with the station 105 as discussed with reference to any of step 2003, step 520 of FIG. 5 step 630 of FIG. 6, step 730 or step 735 of FIG. 7, step 840 or step 845 of FIG. 8, step 1030 of FIG. 10, step 1220 of FIG. 12, step 1320 of FIG. 13, or any combination thereof.

The access point 115 can then provide one or more features to the station 105 as discussed with reference, for example, to FIG. 12 and/or FIG. 13.

Figure 21:
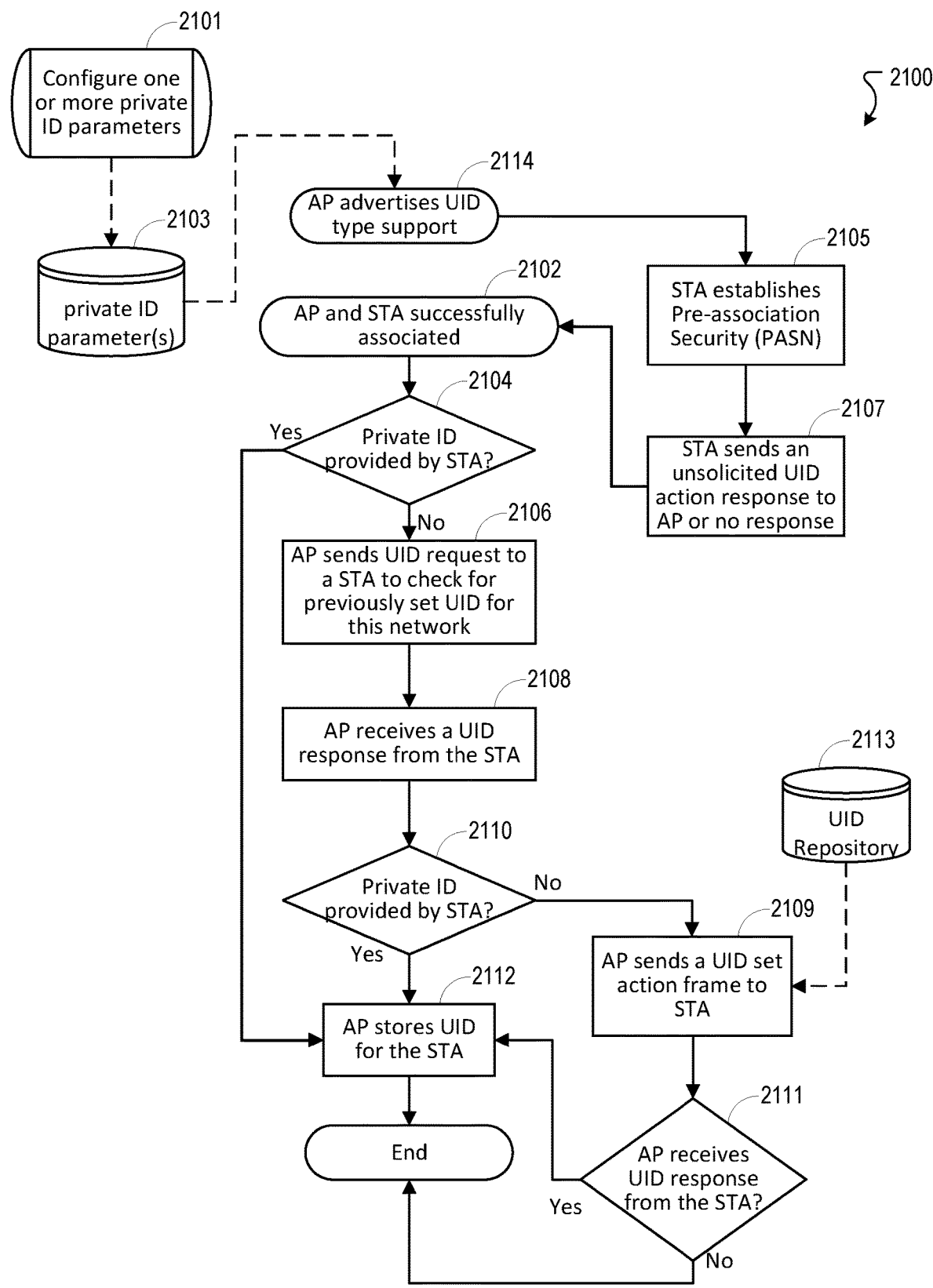
FIG. 21 is a flow chart of an access point providing a unique identifier to a station.

FIG. 21 is a flow chart of an access point 115 providing a unique identifier to a station 105 in a network. As an initial setup for the process 2100, at step 2101 one or more unique identifiers or private unique identifiers parameters associated with a unique identifier are configured similar to or the same as step 2001 of FIG. 20. Similar to step 2003, at step 2103 the one or more unique identifier parameters (also to referred to as requirements) are stored. The process 2100 can then begin at step 2114 with advertising support of unique identifiers. Steps 2114, 2105 and 2107 are similar to or the same as steps 2014, 2005, and 2007 of FIG. 20.

After the station 105 successfully associates with the access point 115, at step 2102, the access point 115 can, for example, receive, from step 2107, an unsolicited unique identifier response action frame or no response from the station 105. At step 2104, the access point 115 determines if a unique identifier is provided by the station 105, for example, as discussed with reference to step 2008 of FIG. 20. If a unique identifier was not received, then at step 2106 the access point 115 sends a unique identifier request (for example, a unique identifier query request action frame 2300) to the station 105 to check for a previously set unique identifier for the station 105 associated with network and the process continues at step 2108. If a unique identifier was provided by the station 105, the process continues at step 2112.

At step 2108, the access point 115 receives a unique identifier response from the station 105, such as a unique identifier query response action frame 2400. At step 2110, the access point 115 determines if a unique identifier was provided by the station 105 in the unique identifier response, for example, a unique identifier is provided as unique identifier 2408. If a unique identifier is provided at step 2111 the process continues at step 2112. At step 2112, if the access point 115 receives an acknowledgement, a response at step 2111, or other notification from the station 105 indicating that the station 105 received the unique identifier set action frame 2500, set the unique identifier for the station 105 based on the unique identifier set action frame 2500, or both, the access point 115 stores the unique identifier for the station 105 so that for a subsequent association the stored unique identifier associated with the station can be used by the access point 115 without requiring steps 2104-2112.

If a unique identifier is not provided at step 2110, the process continues at step 2109 where the access point 115 sends a unique identifier set action frame, such as unique identifier set action frame 2500, to the station 105. The access point 115 can receive a unique identifier for the station 105 from a unique identifier repository 2113. In one or more embodiments, unique identifier repository 2113 is included in or is part of the repository that stores the one or more private unique identifier parameter(s) 2103. At step 2111, the access point 115 determines if a unique identifier response (for example, a unique identifier query response action frame 2400) was received from the station 105 that confirms the unique identifier sent at step 2109 has been set by the station 105. If the access point 115 receives a unique identifier response, the process continues at step 2112, otherwise the process ends.

Figure 22:
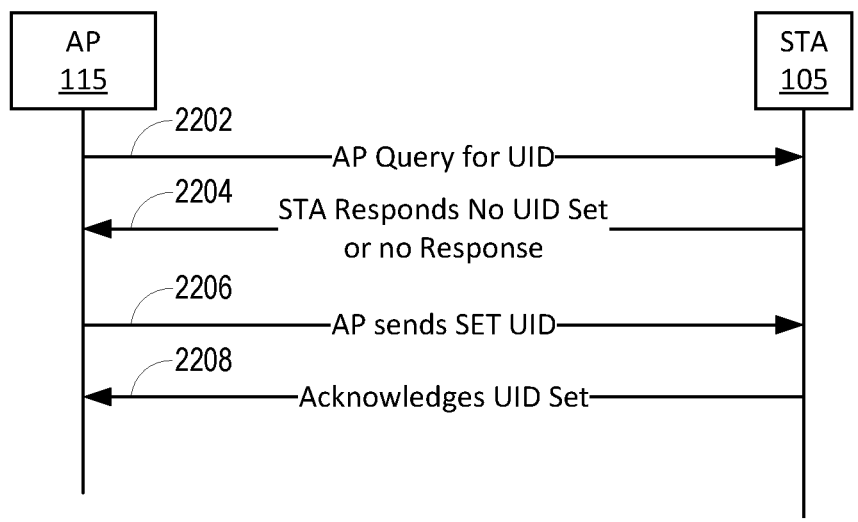
FIG. 22 is a flow diagram of an access point providing a unique identifier to a station.

FIG. 22 is a flow diagram of an access point 115 providing a unique identifier to a station 105. At 2202 access point in a network, for example, within a local wireless network 110, sends a query for a unique identifier to a station 105, for example, a unique identifier request action frame 1800 of FIG. 18. At 2204, the station 105 can send a response or send no response to the query from the access point 115. The response can indicate that the station 105 does not have a unique identifier set for this network. For example, the response from the station 105 can comprise a NULL frame, a NULL field as the unique identifier field within an action frame, a unique identifier response action frame, any other response indicative of the status of the station 105 with respect to a unique identifier, or any combination thereof. At 2206, the access point 115 sends a set unique identifier instructions to the station 105 so as to push a unique identifier to the station 105. The set unique identifier instruction can comprise a unique identifier set action frame 2500 of FIG. 25. At step 2208, the station 105 can acknowledge that the unique identifier for the station 105 has been set based on the set unique identifier instruction, for example, the station 105 can send a unique identifier query response action frame 2400 of FIG. 24. In this way, the access point 115 can set the unique identifier of a statin 105 without requiring use of a MAC address, which are either randomized or changed, so that the user is not required to login or perform other actions required to be performed to identify the station upon re-association to the access point.

Those skilled in the art will appreciate that the invention improves upon methods and systems for handling unique identifiers for stations. Methods, systems, and computer readable media can be operable to facilitate an exchange of messages between an access point and a station, wherein the access point requests a unique identifier from the station. The station may either respond with a message declining to provide a unique identifier or respond with a message including a unique identifier to be used by the access point for the station. The response from the station may include additional limitations on the use of the unique identifier by the access point. The access point may enforce different features, such as different policies, against a station depending upon how the station responds to the unique identifier request.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multi-tasking and parallel processing may be advantageous.

I claim:

1. A method for an access point of a network to provide a unique identifier to a station, the method comprising:
   receiving a unique identifier query response action frame from the station that indicates whether the station is associated with a corresponding unique identifier for the network; and
   sending a unique identifier set action frame to the station based on the unique identifier query response action frame, wherein the unique identifier set action frame provides the unique identifier to the station;
   send a unique identifier query request action frame to the station;
   wherein the sending the unique identifier query request action frame is after expiration of a response time period.

2. The method of claim 1, further comprising:
   receiving a unique identifier query response action frame from the station.

3. The method of claim 1, wherein the unique identifier query response action frame is unsolicited.

4. The method of claim 1, wherein the unique identifier set action frame contains a duration of time associated with the unique identifier.

5. The method of claim 1, further comprising:
   receiving a subsequent unique identifier query response action frame from the station that indicates the unique identifier previously set by the network, wherein the unique identifier is based on the unique identifier set action frame; and
   determining that the unique identifier remains valid for the network.

6. An access point of a network to provide a unique identifier to a station, the access point comprising:
   a memory; and
   a processor configured to execute one or more instructions stored on the memory to cause the access point to:
   receive a unique identifier query response action frame from the station that indicates whether the station is associated with a corresponding unique identifier for the network; and send a unique identifier set action frame to the station based on the unique identifier query response action frame, wherein the unique identifier set action frame provides the unique identifier to the station;

send a unique identifier query request action frame to the station;

wherein the sending the unique identifier query request action frame is after expiration of a response time period.

7. The access point of claim 6, wherein the process is further configured to execute the one or more instructions to further cause the access point to:

receive a unique identifier query response action frame from the station.

8. The access point of claim 6, wherein the unique identifier query response action frame is unsolicited.

9. The access point of claim 6, wherein the unique identifier set action frame contains a time duration of time associated with the unique identifier.

10. The access point of claim 6, wherein the process is further configured to execute the one or more instructions to further cause the access point to:

receive a subsequent unique identifier query response action frame from the station that indicates the unique identifier previously set by the network, wherein the unique identifier is based on the unique identifier set action frame; and determine that the unique identifier remains valid for the network.

11. A non-transitory, computer-readable medium of an access point storing one or more computer-readable instructions for providing a unique identifier to a station that when executed by a processor, cause the processor to perform one or more operations comprising:

receiving a unique identifier query response action frame from the station that indicates whether the station is associated with a corresponding unique identifier for the network; and sending a unique identifier set action frame to the station based on the unique identifier query response action frame, wherein the unique identifier set action frame provides the unique identifier to the station;

sending a unique identifier query request action frame to the station;

wherein the sending the unique identifier set action frame is after expiration of a response time period.

12. The non-transitory, computer-readable medium of claim 11, wherein the one or more computer-readable instructions when executed by a processor, further cause the processor to perform one or more operations further comprising:

receiving a unique identifier query response action frame from the station.

13. The non-transitory, computer-readable medium of claim 11, wherein at least one of:

the unique identifier query response action frame is unsolicited; and the unique identifier set action frame contains a duration of time associated with the unique identifier.

14. The non-transitory, computer-readable medium of claim 11, wherein the one or more computer-readable instructions when executed by a processor, further cause the processor to perform one or more operations further comprising:

receiving a subsequent unique identifier query response action frame from the station that indicates the unique identifier previously set by the station, wherein the unique identifier is based on the unique identifier set action frame; and determining that the unique identifier remains valid for the network.

* * * * *